(12) United States Patent
Nitta et al.

(10) Patent No.: US 7,191,398 B2
(45) Date of Patent: Mar. 13, 2007

(54) SYSTEMS AND METHODS FOR PRODUCING DIGITAL CONTENT

(75) Inventors: Takashi Nitta, Chino (JP); Hirotaka Ohashi, Chino (JP)

(73) Assignee: Seiko Epson Corporation, Tokyo (JP)

( * ) Notice: Subject to any disclaimer, the term of this patent is extended or adjusted under 35 U.S.C. 154(b) by 873 days.

(21) Appl. No.: 10/107,579

(22) Filed: Mar. 28, 2002

(65) Prior Publication Data

US 2002/0165937 A1 Nov. 7, 2002

(30) Foreign Application Priority Data

Mar. 29, 2001 (JP) ............................. 2001-097543

(51) Int. Cl.
*G06G 17/00* (2006.01)
(52) U.S. Cl. ..................... 715/517; 715/503; 715/504; 715/520
(58) Field of Classification Search ................ 715/517
See application file for complete search history.

(56) References Cited

U.S. PATENT DOCUMENTS

| | | | | |
|---|---|---|---|---|
| 4,969,093 A | * | 11/1990 | Barker et al. ............... | 718/102 |
| 5,323,312 A | * | 6/1994 | Saito et al. .................. | 715/513 |
| 5,347,632 A | * | 9/1994 | Filepp et al. ................ | 709/202 |
| 5,379,373 A | * | 1/1995 | Hayashi et al. ............. | 715/513 |
| 5,381,523 A | * | 1/1995 | Hayashi ....................... | 715/513 |
| 5,600,771 A | * | 2/1997 | Hayashi et al. ............. | 715/517 |
| 5,758,257 A | * | 5/1998 | Herz et al. .................. | 725/116 |
| 5,835,916 A | * | 11/1998 | Inaki et al. .................. | 715/509 |
| 5,860,073 A | * | 1/1999 | Ferrel et al. ................. | 715/522 |
| 6,021,416 A | * | 2/2000 | Dauerer et al. ............. | 715/501.1 |
| 6,029,182 A | * | 2/2000 | Nehab et al. ................ | 715/523 |
| 6,498,987 B1 | * | 12/2002 | Kelly et al. .................. | 702/3 |
| 6,633,879 B1 | * | 10/2003 | Jeffries ........................ | 707/100 |
| 6,920,617 B2 | * | 7/2005 | Nitta ............................ | 715/745 |

FOREIGN PATENT DOCUMENTS

| | | |
|---|---|---|
| JP | A 4-60758 | 2/1992 |
| JP | A 4-131962 | 5/1992 |
| JP | 08-256256 A | 10/1996 |
| JP | A 11-066065 | 3/1999 |
| JP | A 11-096157 | 4/1999 |
| JP | 2001-013818 A | 1/2001 |
| WO | WO 00/67092 | 11/2000 |

* cited by examiner

*Primary Examiner*—Heather R. Herndon
*Assistant Examiner*—Michael K. Botts
(74) *Attorney, Agent, or Firm*—Oliff & Berridge, PLC

(57) ABSTRACT

The present invention provides a digital content production system which appropriately arranges information in a blank region present in a layout area in an easy-to-read layout without destroying layout consistency. The present invention can include a content delivery terminal that lays out a digital content by selecting the digital contents in a content registration data base based on user information, and by arranging a variety of pieces of information forming the selected digital contents into a predetermined frame in a layout area. When a blank region is present in the layout area after information forming the digital contents is arranged in the layout area, one of the information arrangement processes for arranging information into the blank region through respective different methods is searched for and retrieved based on the size of the blank region, and the information is arranged into the blank region by using the retrieved information arrangement process.

12 Claims, 14 Drawing Sheets

| USER ID | DESTINATION ADDRESS | CATEGORY NO. | KEYWORD | DATE OF DELIVERY | TIME OF DELIVERY | LAYOUT NO. | MAXIMUM NO. OF PAGES | FONT SIZE |
|---|---|---|---|---|---|---|---|---|
| Andy | Andy@aaa.com | 1700 | PROCESSOR | EVERYDAY | 5 | 2 | 2 | SMALL |
| Bill | Bill@bbb.com | 1501 | OS | WEEKDAY | 11 | 5 | 2 | SMALL |
| Candy | Candy@ccc.com | 201* | APPLICATION | WEEKEND | 9 | 6 | u | STANDARD |

300 USER PROFILE TABLE
302, 304, 306, 308, 310, 312, 314, 316, 318

330 LAYOUT NUMBER DEFINITION TABLE

| LAYOUT NO. | LAYOUT DEFINITION FILE |
|---|---|
| 1 | form01 |
| 2 | form02 |
| 3 | form03 |
| 4 | form04 |
| 5 | form05 |
| 6 | form06 |

(a)

(b)

(a)

(b)

SYSTEMS AND METHODS FOR PRODUCING DIGITAL CONTENT

BACKGROUND OF THE INVENTION

1. Field of Invention

The present invention relates to a system for producing a digital content and a program for use in the system. More particularly, the invention relates to a digital content production system and a digital content production program suitable for arranging information in a blank region present in a layout area in an easy-to-read layout without destroying layout consistency.

2. Description of Related Art

Digital content delivery systems for providing users with digital contents, such as news, have been available. In such a digital content delivery system, several digital contents are read from a content registration data base (hereinafter the data base is simply referred to as DB), the read digital content is edited, and the edited digital content is then delivered to a user. In the editing process of the digital content, the digital content is edited in a layout easy for users to view. As techniques available to do the layout, there are a document layout apparatus disclosed in Japanese Unexamined Patent Application Publication No. 9-69096 (hereinafter referred to as a first conventional art), and a learning-type information editing apparatus disclosed in Japanese Unexamined Patent Application Publication No. 5-233709 (hereinafter referred to as a second conventional art).

In the first conventional art, each of a plurality of types of column structures has several rectangular shapes into which space of a page is segmented by randomly-arranged vertical and horizontal lines. A layout device searches for a single column or a composite column including a plurality of linked adjacent columns, appropriate for layout of each document, in accordance with a random document processing order. Several layouts result, in which a plurality of documents are organized in a plurality of column settings. A layout result assessment device sets a score to each layout result based on a document posting priority order of each document. A best layout result search device selects the layout result having the highest score. A printing device prints documents in which a plurality of documents is organized in the column setting in accordance with the best layout result.

In the second conventional art, a document storage unit stores document information to be provided in response to a request for viewing from a user, and a history storage unit stores history data of viewing linked with user information. The history data of viewing indicates viewing status by the user who has viewed the document information stored in the document storage unit. The history data of viewing corresponding to the user information and designated through an input unit is read from the history storage unit. The document information stored in the document storage unit is edited in accordance with the history data of viewing information.

In the layout process of the digital content, a variety of pieces of information forming the digital content (such as pictures and text) is arranged in a predetermined frame in a layout area. Depending on the digital content, information may not evenly be arranged, and a blank region containing no information arranged therewithin can occur in the layout area. The presence of a blank region in the layout area is not aesthetically pleasing. Efforts have been made to arrange information in a blank region. One known technique for arranging information in a blank region is, for example, a document automatic layout apparatus disclosed in Japanese Unexamined Patent Application Publication No. 4-60758 (hereinafter referred to as a third conventional art).

A blank region may occur in the layout area after a diversity of pieces of information forming the digital content is arranged in the layout area. The third conventional art modifies the font size of characters, the pitch of text, and the pitch of lines in text if the text is determined as being inappropriate in the blank area. The text is then arranged into the blank region.

In accordance with the third conventional art, text is arranged into the blank region by modifying the font size of characters, the pitch of text, and the pitch of lines. The digital content thus becomes different from an area where the blank region is present to the other area where no blank region is present. Often, this can destroy the layout consistency of the content.

The text to be arranged into the blank area is solely determined by details of the original digital content. Thus, there are times when text having a large number of characters is arranged into a small blank region or when text having a small number of characters is arranged into a large blank region. In the former case, the font size of characters, the text pitch, and the line pitch become excessively small only in the blank region in order to arrange the text in the blank region. Conversely, in the latter case, the font size, the text pitch, and the line pitch become excessively large only in the blank region. Layout consistency is thus extremely damaged.

This problem becomes pronounced when a digital content, such as news, is supplied to users. In this case, the digital content is selected and arranged on a page-by-page basis from a content registration DB. To improve the quality of service, an article having a higher level of importance is preferred to be posted on a page close to a front page. This method is typically adopted in paper-based publications, such as newspapers and magazines. If the document to be arranged into the blank region is fixed in a single manner, an article having a relatively low level of importance may be arranged on a blank region on a page close to a front page, or conversely, an important article may be arranged on a blank region on a page close to an end page. This causes the user difficulty in reading the text even though it is arranged in a blank page. Service quality can therefore be deteriorated.

SUMMARY OF THE INVENTION

The present invention has been developed in view of the above unresolved problem of the conventional arts. It is an object of the present invention to provide a digital content production system and a digital content production program which is appropriate for arranging information into a blank region present in a layout area in a layout easy to read without impairing layout consistency.

To achieve the above object, a digital content production system of the present invention can include a content storage device that stores registered digital contents, a content selection device for selecting digital contents for arrangement in the content storage device, and a content production device for producing the digital content for output by determining an output layout of the digital contents for arrangement selected by the content selection device. The content production device can produce the digital content for output by arranging information forming the digital contents for arrangement into a predetermined frame in a layout area. When a blank region containing no information arranged therewithin is present in the layout area after the information forming the digital contents for arrangement is arranged in the layout area, the content selection device and the content production device arrange a text information storage frame for storing text information into the blank region, select a digital content for the blank region in the content storage means in accordance with a predetermined priority order, store the text information contained in the selected digital content for the blank region into the text information storage frame if the number of characters of the text information contained in the selected digital content for the blank region does not exceed the number of characters storable in the text information storage frame, and perform again selection of a digital content for the blank region if the number of characters of the text information contained in the selected digital content for the blank region exceeds the number of characters storable in the text information storage frame.

In this arrangement, the content selection device selects the digital contents for arrangement in the content storage device, and the content production device produces the digital content for output by arranging information forming the selected digital contents for arrangement into the predetermined frame in the layout area.

When the blank region is present in the layout area after the information forming the digital contents for arrangement is arranged in the layout area, the content selection device and the content production device arrange the text information storage frame into the blank region, select the digital content for the blank region in the content storage device in accordance with the predetermined priority order. As a result, the content selection device and the content production device store the text information contained in the selected digital content for the blank region into the text information storage frame if the number of characters of the text information contained in the selected digital content for the blank region does not exceed the number of characters storable in the text information storage frame, and perform again selection of a digital content for the blank region if the number of characters of the text information contained in the selected digital content for the blank region exceeds the number of characters storable in the text information storage frame.

The content storage device stores the registered digital contents at any time. The content storage device may store beforehand the registered digital contents, or alternatively, without storing beforehand the registered digital contents, store the registered digital contents when it is input from outside during the operation of the system.

The system may be embodied in a single apparatus, or in a network system in which a plurality of terminals is connected to each other for communication. In the latter case, each component of the system can be included in any of the terminals as long as the components remain capable of communicating with each other.

The output layouts include a display layout according to which the digital content for output is presented on a screen, and a print layout according to which the digital content for output is printed out on a sheet of paper.

A digital content production system of the present invention can include a content storage device for storing registered digital contents, a device content selection device for selecting digital contents for arrangement in the content storage device, and a content production device for producing the digital content for output by determining an output layout of the digital contents for arrangement selected by the content selection device. The content production device produces the digital content for output by arranging information forming the digital contents for arrangement into a predetermined frame in a layout area. When a blank region containing no information arranged therewithin is present in the layout area after the information forming the digital contents for arrangement is arranged in the layout area, the content selection device and the content production device arrange a text information storage frame for storing text information into the blank region, select, in the content storage device, a digital content for the blank region containing the text information having the number of characters matching the number of characters storable in the text information storage frame, and store the text information contained in the selected digital content for the blank region into the text information storage frame.

In this arrangement, the content selection device selects the digital contents for arrangement in the content storage device, and the content production device produces the digital content for output by arranging information forming the selected digital contents for arrangement into the predetermined frame in the layout area.

When the blank region is present in the layout area after the information forming the digital contents for arrangement is arranged in the layout area, the content selection device and the content production device can arrange the text information storage frame into the blank region, select, in the content storage device, the digital content for the blank region containing the text information having the number of characters matching the number of characters storable in the text information storage frame, and store the text information contained in the selected digital content for the blank region into the text information storage frame.

A digital content production system of the present invention can include a content storage device for storing registered digital contents, a content selection device for selecting digital contents for arrangement in the content storage device, and a content production device for producing the digital content for output by determining an output layout of the digital contents for arrangement selected by the content selection device. The content production device produces the digital content for output by arranging information forming the digital contents for arrangement into a predetermined frame in a layout area. When a blank region containing no information arranged therewithin is present in the layout area after the information forming the digital contents for arrangement is arranged in the layout area, the content selection device and the content production device arrange a text information storage frame for storing text information into the blank region, select, in the content storage device, a digital content for the blank region containing the text information that forms sentences with a minimum number of characters, and store the text information contained in the selected digital content for the blank region into the text information storage frame.

In this arrangement, the content selection device selects the digital contents for arrangement in the content storage device, and the content production device produces the digital content for output by arranging information forming the selected digital contents for arrangement into the predetermined frame in the layout area.

When the blank region is present in the layout area after the information forming the digital contents for arrangement is arranged in the layout area, the content selection device and the content production device arrange the text information storage frame into the blank region, select, in the content storage device, the digital content for the blank region containing the text information with a minimum number of characters, and store the text information contained in the selected digital content for the blank region into the text information storage frame.

A digital content production system of the present invention can include a content storage device for storing registered digital contents, a content selection device for selecting digital contents for arrangement in the content storage device, and a content production device for producing the digital content for output by determining an output layout of the digital contents for arrangement selected by the content selection device. The content production device can produce the digital content for output by arranging information forming the digital contents for arrangement into a predetermined frame in a layout area. When a blank region containing no information arranged therewithin is present in the layout area after the information forming the digital contents for arrangement is arranged in the layout area, one of a plurality of information arrangement processes for arranging information into the blank region through respective different methods is selected based on the size of the blank region, and the information is arranged into the blank region through the selected information arrangement process.

In this arrangement, the content selection device can select the digital contents for arrangement in the content storage device, and the content production device the digital content for output by arranging information forming the selected digital contents for arrangement into the predetermined frame in the layout area.

When the blank region is present in the layout area after the information forming the digital contents for arrangement is arranged in the layout area, one of the plurality of information arrangement processes different from one another is selected based on the size of the blank region, and the information is arranged into the blank region through the selected information arrangement process.

A digital content production system of the present invention can include a content storage device for storing registered digital contents, a content selection device for selecting digital contents for arrangement in the content storage device, and a content production device for producing the digital content for output by determining an output layout of the digital contents for arrangement selected by the content selection device. The content production device produces the digital content for output, including one or a plurality of layout areas on a one layout area per page basis, by arranging information forming the digital contents for arrangement into a predetermined frame in a layout area. When a blank region containing no information arranged therewithin is present in the layout area after the information forming the digital contents for arrangement is arranged in the layout area, one of a plurality of information arrangement processes for arranging information into the blank region through respective different methods is selected based on page information relating to the page of the layout area, and the information is arranged into the blank region through the selected information arrangement process.

In this arrangement, the content selection device selects the digital contents for arrangement in the content storage device, and the content production device produces the digital content for output, including one or a plurality of layout areas on a one layout area per page basis, by arranging information forming the selected digital contents for arrangement into the predetermined frame in the layout area.

When the blank region is present in the layout area after the information forming the digital contents for arrangement is arranged in the layout area, one of the plurality of information arrangement processes different from one another is selected based on the page information relating to the page of the layout area, and the information is arranged into the blank region through the selected information arrangement process.

A digital content production system of the present invention can include a content storage device for storing registered digital contents, a content selection device for selecting digital contents for arrangement in the content storage device, and a content production device for producing the digital content for output by determining an output layout of the digital contents for arrangement selected by the content selection device. The content production device produces the digital content for output by arranging information forming the digital contents for arrangement into a predetermined frame in a layout area. When a blank region containing no information arranged therewithin is present in the layout area after the information forming the digital contents for arrangement is arranged in the layout area, one of a plurality of information arrangement processes for arranging information into the blank region through respective different methods is selected based on the location of the blank region in the layout area, and the information is arranged into the blank region through the selected information arrangement process.

In this arrangement, the content selection device selects the digital contents for arrangement in the content storage device, and the content production device produces the digital content for output by arranging information forming the selected digital contents for arrangement into the predetermined frame in the layout area.

When the blank region is present in the layout area after the information forming the digital contents for arrangement is arranged in the layout area, one of the plurality of information arrangement processes different from one another is selected based on the location of the blank region in the layout area, and the information is arranged into the blank region through the selected information arrangement process.

A digital content production system of the present invention can include a content storage device for storing registered digital contents, a content selection device for selecting digital contents for arrangement in the content storage device, and a content production device for producing the digital content for output by determining an output layout of the digital contents for arrangement selected by the content selection device. The content production device produces the digital content for output by arranging information forming the digital contents for arrangement into a predetermined frame in a layout area. When a blank region containing no information arranged therewithin is present in the layout area after the information forming the digital contents for arrangement is arranged in the layout area, one of a plurality of information arrangement processes for arranging information into the blank region through respective different methods is selected based on the shape of the blank region, and the information is arranged into the blank region through the selected information arrangement process.

In this arrangement, the content selection device selects the digital contents for arrangement in the content storage device, and the content production device produces the digital content for output by arranging information forming the selected digital contents for arrangement into the predetermined frame in the layout area.

When the blank region is present in the layout area after the information forming the digital contents for arrangement is arranged in the layout area, one of the plurality of information arrangement processes different from one another is selected based on the shape of the blank region, and the information is arranged into the blank region through the selected information arrangement process.

A digital content production system of the present invention can include a content storage device for storing registered digital contents, a content selection device for selecting digital contents for arrangement in the content storage device, and a content production device for producing the digital content for output by determining an output layout of the digital contents for arrangement selected by the content selection device. The content production device produces the digital content for output by arranging information forming the digital contents for arrangement into a predetermined frame in a layout area. When a blank region containing no information arranged therewithin is present in the layout area after the information forming the digital contents for arrangement is arranged in the layout area, one of a plurality of information arrangement processes for arranging information into the blank region through respective different methods is selected based on a designated upper limit of the number of pages, and the information is arranged into the blank region through the selected information arrangement process.

In this arrangement, the content selection device selects the digital contents for arrangement in the content storage device, and the content production device produces the digital content for output by arranging information forming the selected digital contents for arrangement into the predetermined frame in the layout area.

When the blank region is present in the layout area after the information forming the digital contents for arrangement is arranged in the layout area, one of the plurality of information arrangement processes different from one another is selected based on the designated upper limit of the number of pages, and the information is arranged into the blank region through the selected information arrangement process.

A digital content production system of the present invention can include a content storage device for storing registered digital contents, a content selection device for selecting digital contents for arrangement in the content storage device, and a content production device for producing the digital content for output by determining an output layout of the digital contents for arrangement selected by the content selection device. The content production device produces the digital content for output by arranging information forming the digital contents for arrangement into a predetermined frame in a layout area. When a blank region containing no information arranged therewithin is present in the layout area after the information forming the digital contents for arrangement is arranged in the layout area, one of a plurality of information arrangement processes for arranging information into the blank region through respective different methods is selected based on the number of digital contents for arrangement selected by the content selection means, and the information is arranged into the blank region through the selected information arrangement process.

In this arrangement, the content selection device can select the digital contents for arrangement in the content storage device, and the content production device produces the digital content for output by arranging information forming the selected digital contents for arrangement into the predetermined frame in the layout area.

When the blank region is present in the layout area after the information forming the digital contents for arrangement is arranged in the layout area, one of the plurality of information arrangement processes different from one another is selected based on the number of digital contents for arrangement selected by the content selection device, and the information is arranged into the blank region through the selected information arrangement process.

A digital content production system of the present invention can include a content storage device for storing registered digital contents, a content selection device for selecting digital contents for arrangement in the content storage device, and a content production device for producing the digital content for output by determining an output layout of the digital contents for arrangement selected by the content selection device. The content production device produces the digital content for output by arranging information forming the digital contents for arrangement into a predetermined frame in a layout area. When a blank region containing no information arranged therewithin is present in the layout area after the information forming the digital contents for arrangement is arranged in the layout area, one of a plurality of information arrangement processes for arranging information into the blank region through respective different methods is selected based on the time of delivery or the date and time of delivery for delivering the digital content for output produced by the content production device, and the information is arranged into the blank region through the selected information arrangement process.

In this arrangement, the content selection device can select the digital contents for arrangement in the content storage device, and the content production device can produce the digital content for output by arranging information forming the selected digital contents for arrangement into the predetermined frame in the layout area.

When the blank region is present in the layout area after the information forming the digital contents for arrangement is arranged in the layout area, one of the plurality of information arrangement processes different from one another is selected based on the time of delivery or the date and time of delivery for delivering the digital content for output produced by the content production means, and the information is arranged into the blank region through the selected information arrangement process.

A digital content production system of the present invention can include a content storage device for storing registered digital contents, a content selection device for selecting digital contents for arrangement in the content storage device, and a content production device for producing the digital content for output by determining an output layout of the digital contents for arrangement selected by the content selection device. The content production device produces the digital content for output by arranging information forming the digital contents for arrangement into a predetermined frame in a layout area. When a blank region containing no information arranged therewithin is present in the layout area after the information forming the digital contents for arrangement is arranged in the layout area, one of a plurality of information arrangement processes for arranging information into the blank region through respective different methods is selected based on the location of a user who is supplied with the digital content for output, and the information is arranged into the blank region through the selected information arrangement process.

In this arrangement, the content selection device selects the digital contents for arrangement in the content storage device, and the content production device produces the digital content for output by arranging information forming the selected digital contents for arrangement into the predetermined frame in the layout area.

When the blank region is present in the layout area after the information forming the digital contents for arrangement is arranged in the layout area, one of the plurality of information arrangement processes different from one another is selected based on the location of the user who is supplied with the digital content for output, and the information is arranged into the blank region through the selected information arrangement process.

In a digital content production system of the present invention, the content selection device and the content production device can perform one of the plurality of information arrangement processes by arranging a text information storage frame for storing text information into the blank region, by selecting the digital content for the blank region in the content storage means in accordance with a predetermined priority order, by storing the text information contained in the selected digital content for the blank region into the text information storage frame if the number of characters of the text information contained in the selected digital content for the blank region does not exceed the number of characters storable in the text information storage frame, and by performing again selection of a digital content for the blank region if the number of characters of the text information contained in the selected digital content for the blank region exceeds the number of characters storable in the text information storage frame.

When one of the plurality of information arrangement processes is selected in this arrangement, the content selection device and the content production device can arrange the text information storage frame in the blank region and select the digital content for the blank region in the content storage device in accordance with the predetermined priority. As a result, the content selection device and the content production device store the text information contained in the selected digital content for the blank region into the text information storage frame if the number of characters of the text information contained in the selected digital content for the blank region does not exceed the number of characters storable in the text information storage frame. In contrast, if the number of characters of the text information contained in the selected digital content for the blank region exceeds the number of characters storable in the text information storage frame, the content selection device and the content production device perform again selection of a digital content for the blank region.

In a digital content production system of the present invention, the content selection device and the content production device can perform one of the plurality of information arrangement processes by arranging a text information storage frame for storing text information into the blank region, by selecting, in the content storage device, a digital content for the blank region containing the text information having the number of characters matching the number of characters storable in the text information storage frame, and by storing the text information contained in the selected digital content for the blank region into the text information storage frame.

When one of the plurality of information arrangement processes is selected in this arrangement, the content selection device and the content production device arrange the text information storage frame into the blank region, select, in the content storage device, the digital content for the blank region containing the text information having the number of characters matching the number of characters storable in the text information storage frame, and store the text information contained in the selected digital content for the blank region into the text information storage frame.

In a digital content production system of the present invention, the content selection device and the content production device can perform one of the plurality of information arrangement processes by arranging a text information storage frame for storing text information into the blank region, by selecting, in the content storage device, a digital content for the blank region containing the text information that forms sentences with a minimum number of characters, and by storing the text information contained in the selected digital content for the blank region into the text information storage frame.

When one of the plurality of information arrangement processes is selected in this arrangement, the content selection device and the content production device can arrange the text information storage frame into the blank region, select, in the content storage means, the digital content for the blank region containing the text information with a minimum number of characters, and store the text information contained in the selected digital content for the blank region into the text information storage frame.

A digital content production system of the present invention can further include a bonus information storage device for storing bonus information considered beneficial to a user who is supplied with the digital content for output. The content selection device and the content production device perform one of the plurality of information arrangement processes by arranging a bonus information storage frame for storing the bonus information into the blank area, by selecting the bonus information in the bonus information storage device, and by storing the selected bonus information into the bonus information storage frame.

When one of the plurality of information arrangement processes is selected in this arrangement, the content selection device and the content production device can arrange the bonus information storage frame into the blank area, select the bonus information in the bonus information storage device, and store the selected bonus information into the bonus information storage frame.

The bonus information refers to information which is beneficial to a user who is supplied with digital contents for output. The bonus information serves as a piece of information from which the user benefit, or the bonus information itself is a benefit to the user. For example, the bonus information may include a coupon, advertisement information beneficial to the user, logo images data, information such as cartoon and fortunetelling, image data of fave rave, free computer software programs, information relating to the right to receive discount or other benefit in particular stores or any store, and URLs (Universal Resource Locators) of home pages on which a particular service such as information providing service or information searching service is received.

The bonus information storage device stores the bonus information by any technique at any time. The bonus information storage device may store beforehand the bonus information, or alternatively, without storing beforehand the bonus information, it may store the bonus information when it is input from outside during the operation of the system.

A digital content production system of the present invention, further includes user information storage device for storing user information relating to a user, wherein the content selection device selects the digital contents for arrangement in the content storage device in accordance with the user information in the user information storage means.

In this arrangement, the content selection device can select the digital contents for arrangement in the content storage device in accordance with the user information in the user information storage device.

For example, the user information can include the age, sex, interests and preference, the home address, and the name of the user, and the operational environment of a user terminal.

The user information storage device stores the user information by any technique at any time, or may store beforehand the user information. Alternatively, without storing beforehand the user information, the user information storage means stores the user information when it is input from outside during the operation of the system.

A digital content production system of the present invention can further include a user information storage device for storing user information relating to a user, wherein the content production device determines an output layout of the digital contents for arrangement, selected by the content selection device, in accordance with the user information in the user information storage device.

In this arrangement, the content production device can determine the output layout of the digital contents for arrangement, selected by the content selection device, in accordance with the user information in the user information storage device.

For example, when the age information, if included in the user information, indicates that the user is an aged person in the determination of the output layout based on the user information, a relatively large font may be used. When the sex information, if included in the user information, indicates that the user is a female, a rounded font may be employed for the layout. If the preference and interest information is included in the user information, the layout can be like that of magazines intended for children, that of sport papers, or that of technical documents. If the user information includes the home address of the user, the layout may be presented with a scenery possibly characteristic of the location of the address as a background. If the user information includes the name of the user, the layout may have the name on it as the title thereof. When the operational environment information relating to the user terminal, if included in the user information, indicates that the capacity of a RAM in the user terminal is too small, the layout may be designed so as to minimize the amount of data of the image thereof.

To achieve the above-described object, a digital content production program of the present invention enables the above described digital production system, including a computer system, to perform a process to be achieved by the content selection device and the content production device. When a blank region containing no information arranged therewithin is present in the layout area after the information forming the digital contents for arrangement is arranged in the layout area, the content selection device and the content production device arrange a text information storage frame for storing text information into the blank region, select a digital content for the blank region in the content storage device in accordance with a predetermined priority order, store the text information contained in the selected digital content for the blank region into the text information storage frame if the number of characters of the text information contained in the selected digital content for the blank region does not exceed the number of characters storable in the text information storage frame, and perform again selection of a digital content for the blank region if the number of characters of the text information contained in the selected digital content for the blank region exceeds the number of characters storable in the text information storage frame.

In this arrangement, when the digital content production system reads the program and executes the process in accordance with the read program, the operation identical to that of the above digital content production system is performed.

A digital content production program of the present invention enables the above described digital production system, including a computer system, to perform a process to be achieved by the content selection device and the content production device. When a blank region containing no information arranged therewithin is present in the layout area after the information forming the digital contents for arrangement is arranged in the layout area, the content selection device and the content production device arrange a text information storage frame for storing text information into the blank region, select, in the content storage device, a digital content for the blank region containing the text information having the number of characters matching the number of characters storable in the text information storage frame, and store the text information contained in the selected digital content for the blank region into the text information storage frame.

In this arrangement, when the digital content production system reads the program and executes the process in accordance with the read program, the operation identical to that of the above digital content production system can be performed.

A digital content production program of the present invention enables the digital content production system, including a computer system, to perform a process to be achieved by the content selection device and the content production device. When a blank region containing no information arranged therewithin is present in the layout area after the information forming the digital contents for arrangement is arranged in the layout area, the content selection device and the content production device arrange a text information storage frame for storing text information into the blank region, select, in the content storage device, a digital content containing the text information that forms sentences with a minimum number of characters, and store the text information contained in the selected digital content for the blank region into the text information storage frame.

In this arrangement, when the digital content production system reads the program and executes the process in accordance with the read program, the operation identical to that of the above digital content production system can be performed.

A digital content production program of the present invention enables the digital content production system including a computer system, to perform a process to be achieved by the content selection device and the content production device. When a blank region containing no information arranged therewithin is present in the layout area after the information forming the digital contents for arrangement is arranged in the layout area, one of a plurality of information arrangement processes for arranging information into the blank region through respective different methods is selected based on the size of the blank region, and the information is arranged into the blank region through the selected information arrangement process.

In this arrangement, when the digital content production system reads the program and executes the process in accordance with the read program, the operation identical to that of the above digital content production system can be performed.

A digital content production program of the present invention enables the digital content production system including a computer system, to perform a process to be achieved by the content selection device and the content production device. When a blank region containing no information arranged therewithin is present in the layout area after the information forming the digital contents for arrangement is arranged in the layout area, one of a plurality of information arrangement processes for arranging information into the blank region through respective different methods is selected based on page information relating to the page of the layout area, and the information is arranged into the blank region through the selected information arrangement process.

In this arrangement, when the digital content production system reads the program and executes the process in accordance with the read program, the operation identical to that of the above digital content production system can be performed.

A digital content production program of the present invention enables the digital content production system, including a computer system, to perform a process to be achieved by the content selection device and the content production device. When a blank region containing no information arranged therewithin is present in the layout area after the information forming the digital contents for arrangement is arranged in the layout area, one of a plurality of information arrangement processes for arranging information into the blank region through respective different methods is selected based on the location of the blank region in the layout area, and the information is arranged into the blank region through the selected information arrangement process.

In this arrangement, when the digital content production system reads the program and executes the process in accordance with the read program, the operation identical to that of the above digital content production system can be performed.

A digital content production program of the present invention enables the digital content production system including a computer system, to perform a process to be achieved by the content selection means and the content production means. When a blank region containing no information arranged therewithin is present in the layout area after the information forming the digital contents for arrangement is arranged in the layout area, one of a plurality of information arrangement processes for arranging information into the blank region through respective different methods is selected based on the shape of the blank region, and the information is arranged into the blank region through the selected information arrangement process.

In this arrangement, when the digital content production system reads the program and executes the process in accordance with the read program, the operation identical to that of the above digital content production system can be performed.

A digital content production program of the present invention enables the digital content production system including a computer system, to perform a process to be achieved by the content selection means and the content production means. When a blank region containing no information arranged therewithin is present in the layout area after the information forming the digital contents for arrangement is arranged in the layout area, one of a plurality of information arrangement processes for arranging information into the blank region through respective different methods is selected based on a designated upper limit of the number of pages, and the information is arranged into the blank region through the selected information arrangement process.

In this arrangement, when the digital content production system reads the program and executes the process in accordance with the read program, the operation identical to that of the above digital content production system can be performed.

A digital content production program of the present invention enables the digital content production system including a computer system, to perform a process to be achieved by the content selection means and the content production means. When a blank region containing no information arranged therewithin is present in the layout area after the information forming the digital contents for arrangement is arranged in the layout area, one of a plurality of information arrangement processes for arranging information into the blank region through respective different methods is selected based on the number of digital contents for arrangement selected by the content selection means, and the information is arranged into the blank region through the selected information arrangement process.

In this arrangement, when the digital content production system reads the program and executes the process in accordance with the read program, the operation identical to that of the above digital content production system can be performed.

A digital content production program of the present invention enables the digital content production system including a computer system, to perform a process to be achieved by the content selection device and the content production device. When a blank region containing no information arranged therewithin is present in the layout area after the information forming the digital contents for arrangement is arranged in the layout area, one of a plurality of information arrangement processes for arranging information into the blank region through respective different methods is selected based on the time of delivery or the date and time of delivery for delivering the digital content for output produced by the content production means, and the information is arranged into the blank region through the selected information arrangement process.

In this arrangement, when the digital content production system reads the program and executes the process in accordance with the read program, the operation identical to that of the above digital content production system can be is performed.

A digital content production program of the present invention enables the digital content production system including a computer system, to perform a process to be achieved by the content selection means and the content production means. When a blank region containing no information arranged therewithin is present in the layout area after the information forming the digital contents for arrangement is arranged in the layout area, one of a plurality of information arrangement processes for arranging information into the blank region through respective different methods is selected based on the location of a user who is supplied with the digital content for output, and the information is arranged into the blank region through the selected information arrangement process.

In this arrangement, when the digital content production system reads the program and executes the process in accordance with the read program, the operation identical to that of the above digital content production system can be performed.

BRIEF DESCRIPTION OF THE DRAWINGS

The invention will be described with reference to the accompanying drawings, in which like elements are referred to with like numerals, and in which:

FIG. 4 illustrates the data structure of a user profile table 300;

DETAILED DESCRIPTION OF PREFERRED EMBODIMENTS

Figure 1:
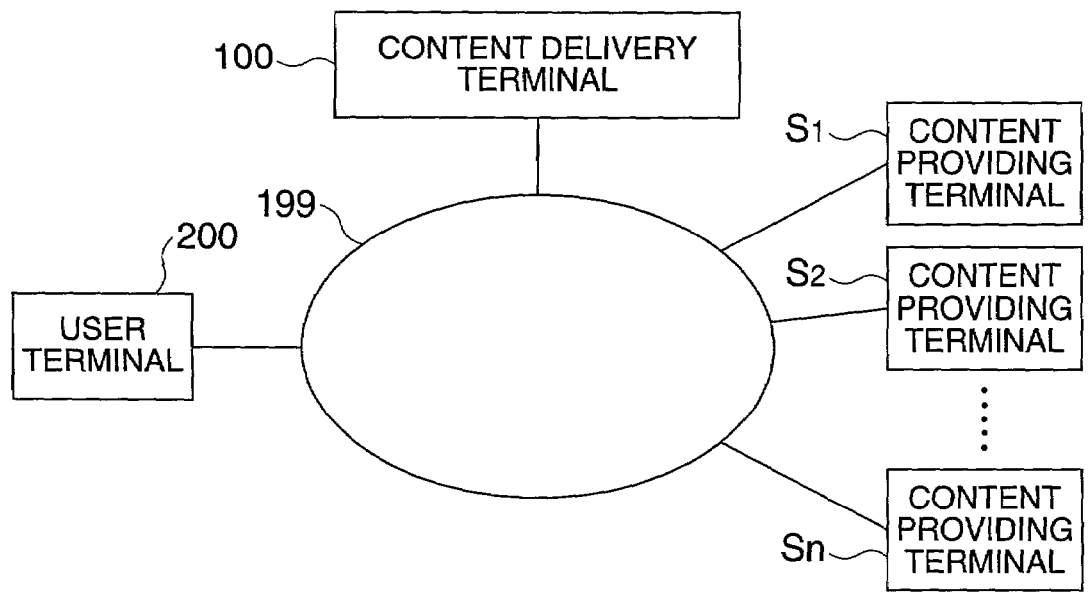
FIG. 1 is a block diagram illustrating the construction of a network in which the present invention is applied.

An exemplary embodiment of the present invention is discussed hereinafter referring to the drawings. FIGS. 1 through 12 show the embodiment of a digital content production system and a digital content production program of the present invention.

The present embodiment employs, as shown in FIG. 1, the digital content production system and the digital content production program of the present invention in which a content delivery terminal 100 delivers a digital content such as news to a user terminal 200.

The construction of a network system implementing the present invention is discussed referring to FIG. 1. FIG. 1 is a block diagram showing an exemplary construction of the network system implementing the present invention.

Connected to the Internet 199 are a plurality of content providing terminals $S_1-S_n$ for providing digital contents, the content delivery terminal 100 for collecting, storing and then delivering digital contents provided by the content providing terminals $S_1-S_n$, and the user terminal 200 used by a user as shown in FIG. 1. Although a single user terminal 200 is shown for simplicity, a plurality of user terminals are actually connected to the Internet 199.

Each of the content providing terminals $S_1-S_n$, having the same function as that of a typically available computer, can be composed of a CPU, an ROM, an RAM, and an I/F, all of which are interconnected to each other through a bus. When the content providing terminal produces a digital content, the terminal adds a category number to the digital content to identify a category of the digital content, and transmits the digital content to the content delivery terminal 100. The category number will be discussed in more detail later.

The user terminal 200, having the same function as that of a typically available computer, is composed of a CPU, an ROM, an RAM, and an I/F, all of which are interconnected to each other through a bus. The user terminal 200 is also equipped with a WWW (World Wide Web) browser, and accesses the content delivery terminal 100 using the WWW browser.

Figure 2:
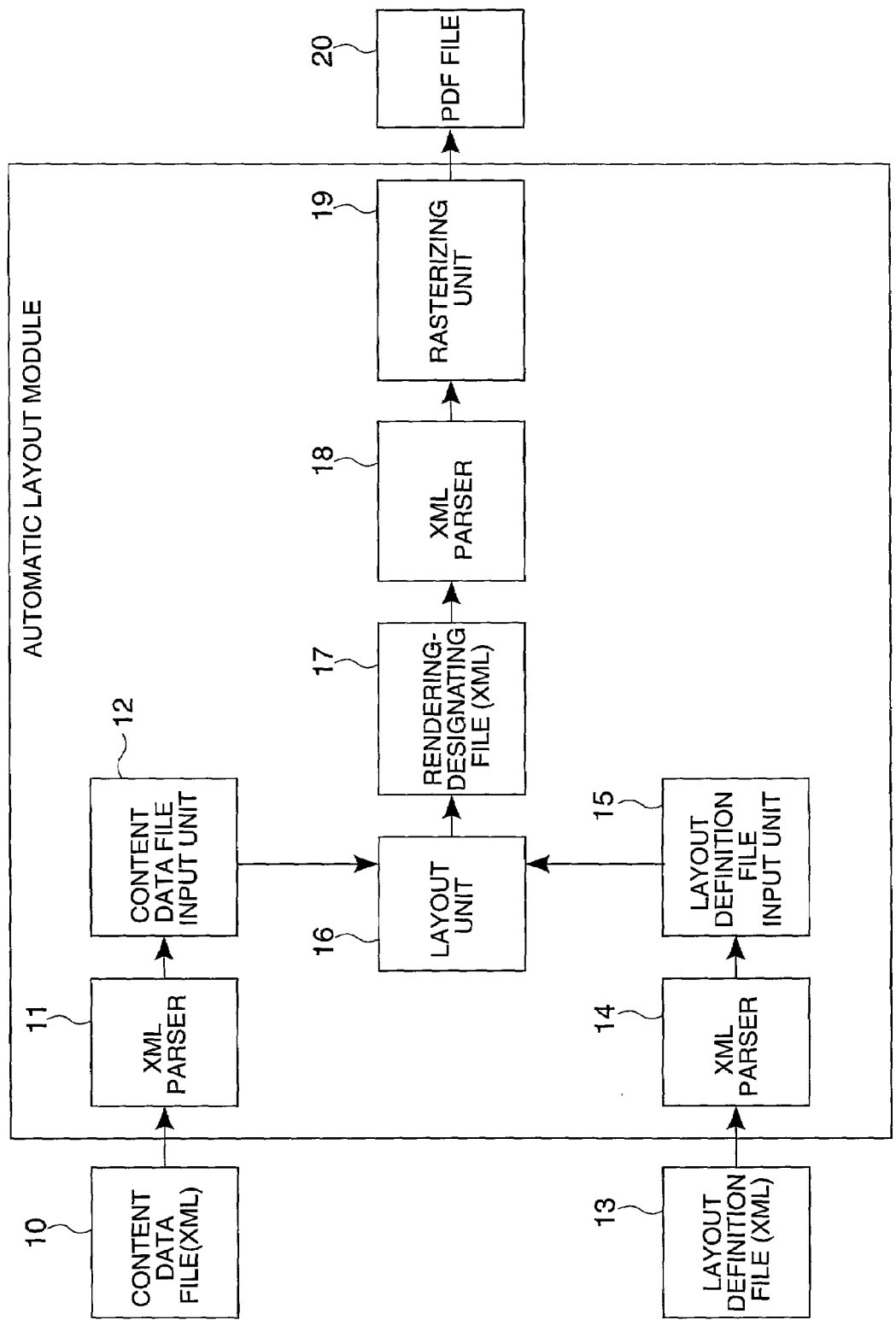
FIG. 2 is a functional block diagram schematically illustrating the function of a content delivery terminal 100.

The function of the content delivery terminal 100 will now schematically be discussed in detail, referring to FIG. 2. FIG. 2 is a block diagram schematically showing the function of the content delivery terminal 100.

Referring to FIG. 2, the content delivery terminal 100 can include an XML parser 11 for parsing a content data file 10 in an XML (extensible Markup Language), a content data file input unit 12 for inputting the content data file 10 parsed by the XML parser 11, an XML parser 14 for parsing an XML layout definition file 13, a layout definition file input unit 15 for inputting the layout definition file 13 parsed by the XML parser 14, a layout unit 16 for performing a layout process based on the content data file 10 and the layout definition file 13 respectively received through the input units 12 and 15, an XML parser 18 for parsing an XML rendering-designating file 17 from the layout unit 16, and a rasterizing unit 19 for producing a file 20 in a PDF (Portable Document Format) by performing rendering based on the rendering-designating file 17 parsed by the XML parser 18. Particularly, the feature of the embodiment of the present invention lies in the layout unit 16 among other components.

Figure 3:
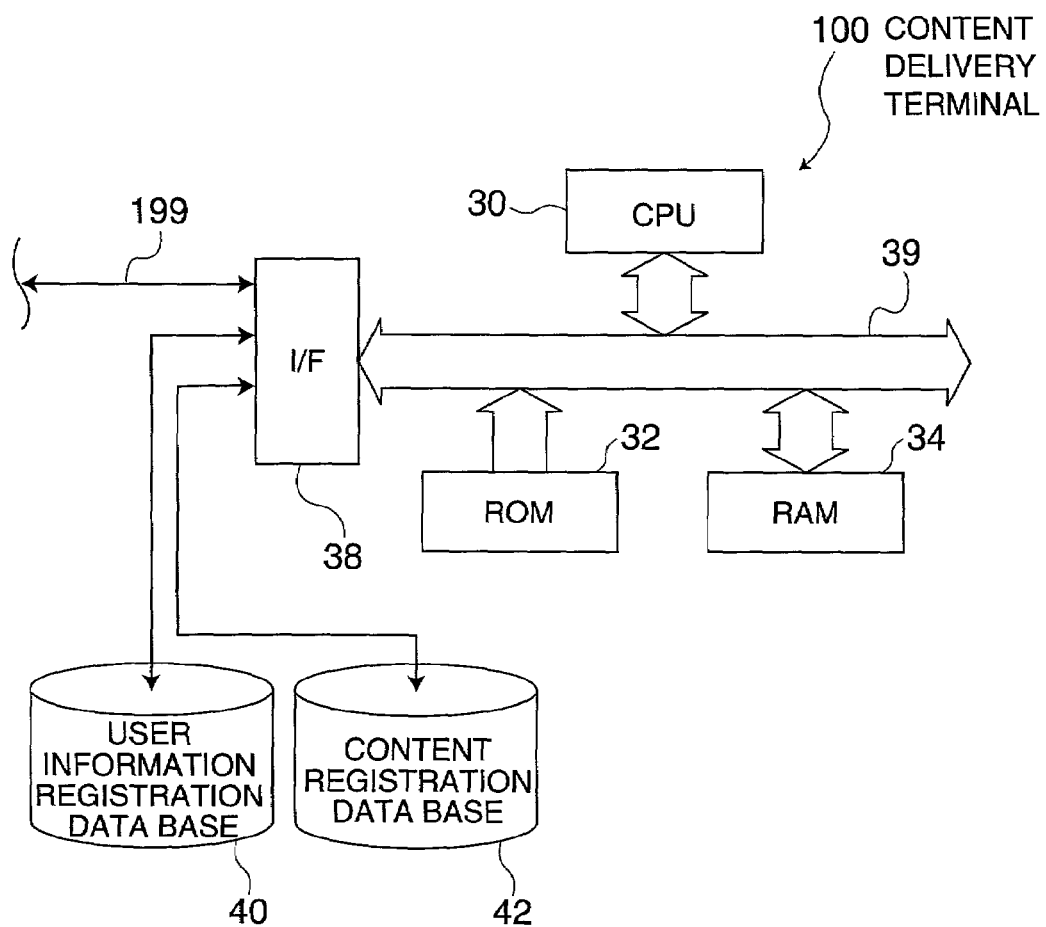
FIG. 3 is a block diagram illustrating the construction of the content delivery terminal 100.

Referring to FIG. 3, the construction of the content delivery terminal 100 will now be discussed in detail. FIG. 3 is a block diagram showing an exemplary construction of the content delivery terminal 100.

Referring to FIG. 3, the content delivery terminal 100 can include a CPU 30 for performing arithmetic operation and controlling the entire system based on a control program, an ROM 32 for storing beforehand a control program, etc., of the CPU 30 in a predetermined area thereof, an RAM 34 for storing data read from the ROM 32 or the like and calculation results required in the course of the arithmetic operation of the CPU 30, and an I/F 38 for interfacing with an external device for exchange of data. To exchange data, these components are mutually interconnected by a bus 39 as a signal line for transferring data.

Connected to the I/F 38 are, as external units, a user information registration DB 40 for registering user information, a content registration DB 42 for collecting and storing digital contents supplied by content providing terminals $S_1-S_n$, and a signal line with which to connect to the Internet 199.

Referring to FIG. 4, the user information registration DB 40 stores a user profile table 300 that registers user information. FIG. 4 shows an exemplary data structure of the user profile table 300.

The user profile table 300 registers a single or a plurality of records for each user as shown in FIG. 4. Each record includes a field 302 that registers a user ID for identifying a user, a field 304 for registering a destination address of a digital content, a field 306 for registering a category number, a field 308 for registering a keyword, a field 310 for registering the date of delivery, a field 312 for registering the time of delivery, a field 314 for registering a layout number, a field 316 for registering a maximum number of pages, and a field 318 for registering a font size.

When a digital content containing a keyword designated by a user is selected as data to be delivered, the field 308 registers that keyword. The keyword may be the one that appears most frequently in documents of a category in which the user is interested. Referring to FIG. 4, a "PROCESSOR" is registered in a first row of the field 308, and an "OS" is registered in a second row of the field 308.

The field 310 registers the date of delivery on which the user desires the delivery of the digital content. For example, when everyday delivery of the digital content is desired, "EVERYDAY" is designated as the date of delivery. When only weekday delivery of the digital content is desired, a "WEEKDAY" is designated. When weekend delivery of the digital content is desired, a "WEEKEND" is designated. Referring to FIG. 4, "EVERYDAY" is registered in a first row of the field 310, and a "WEEKDAY" is registered in a second row of the field 310.

The field 312 registers the time of delivery of the digital content on the delivery date designated by the user. As the time of delivery, one day may be divided into 24 hours from zero to a twenty-third hour, and any hour may be designated. Referring to FIG. 4, a fifth hour is registered in a first row of the field 312, and an eleventh hour is registered in a second row in the field 312.

The field 314 registers the layout number for identifying the output layout of the digital content. For example, the layout number that identifies the output layout desired by the user is designated. Referring to FIG. 4, layout number 2 is registered in a first row of the field 314, and layout number 5 is registered in a second row of the field 314. The layout number will be discussed in more detail later.

The field 316 registers the maximum number of pages as the upper limit for the digital content to be displayed or printed out. The maximum number of pages designates the maximum numbers of pages as the upper limit. Alternatively, the letter "u" may be designated to set no upper limit. Referring to FIG. 4, "2" pages are registered in a first row of the field 316, and the letter "u" is registered in a third row of the field 316.

The field 318 registers the font size when the digital content is displayed or printed out. Referring to FIG. 4, a "SMALL" font is registered in a first row of the field 318, and a "STANDARD" font is registered in a third row of the field 318.

Figure 5:
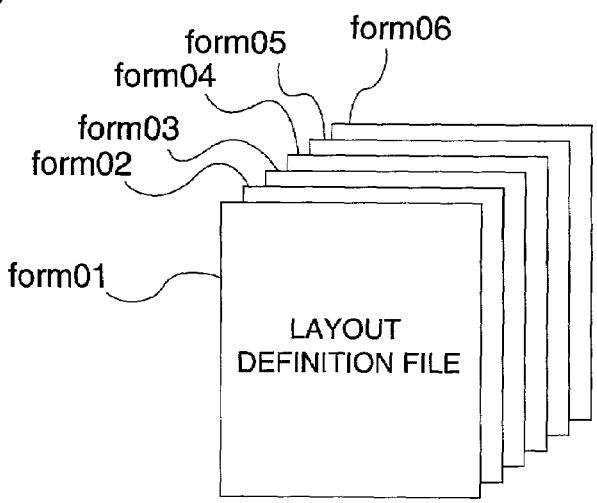
FIG. 5 illustrates a layout definition file and the data structure of a layout number definition table 330.

Referring to FIG. 5, the user information registration DB 40 stores a plurality of layout definition files form01–form06 defining the output layout of the digital contents, and a layout number definition table 330 for indicating the correspondence between the layout definition files form01–form06 and the layout numbers. FIG. 5 shows the layout definition file and the data structure of the layout number definition table 330.

The layout definition files form01–form06 define a text information storage frame for storing text information, the size and layout position of an image contained in the digital content in a printing sheet, the size, the type and color of a font of the text information, the character pitch and the line pitch of the text information, and the number, the quality, the size, and the ratio of images. The layout definition files are defined by using the XML, etc.

Referring to FIG. 5(b), the layout number definition table 330 registers a single record for each layout number. Each record includes a field 332 for registering the layout number, and a field 334 for registering a file name of the layout definition file. As shown in FIG. 5(b), a first record registers "1" as a layout number, and "form01" as a layout definition file name, and a second record registers "2" as a layout number, and "form02" as a layout definition file name.

Figure 6:
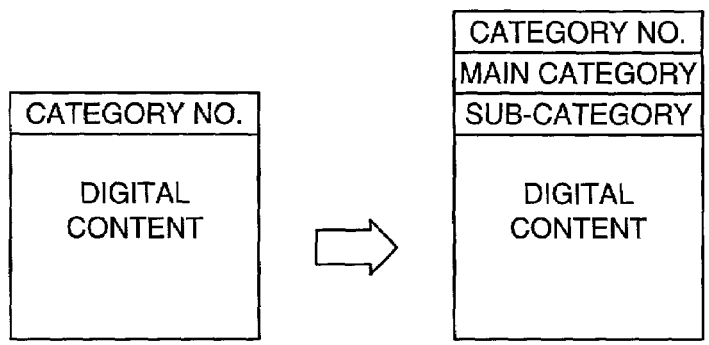
FIG. 6 illustrates a digital content and the data structure of a category number definition table 340.
Figure 6:
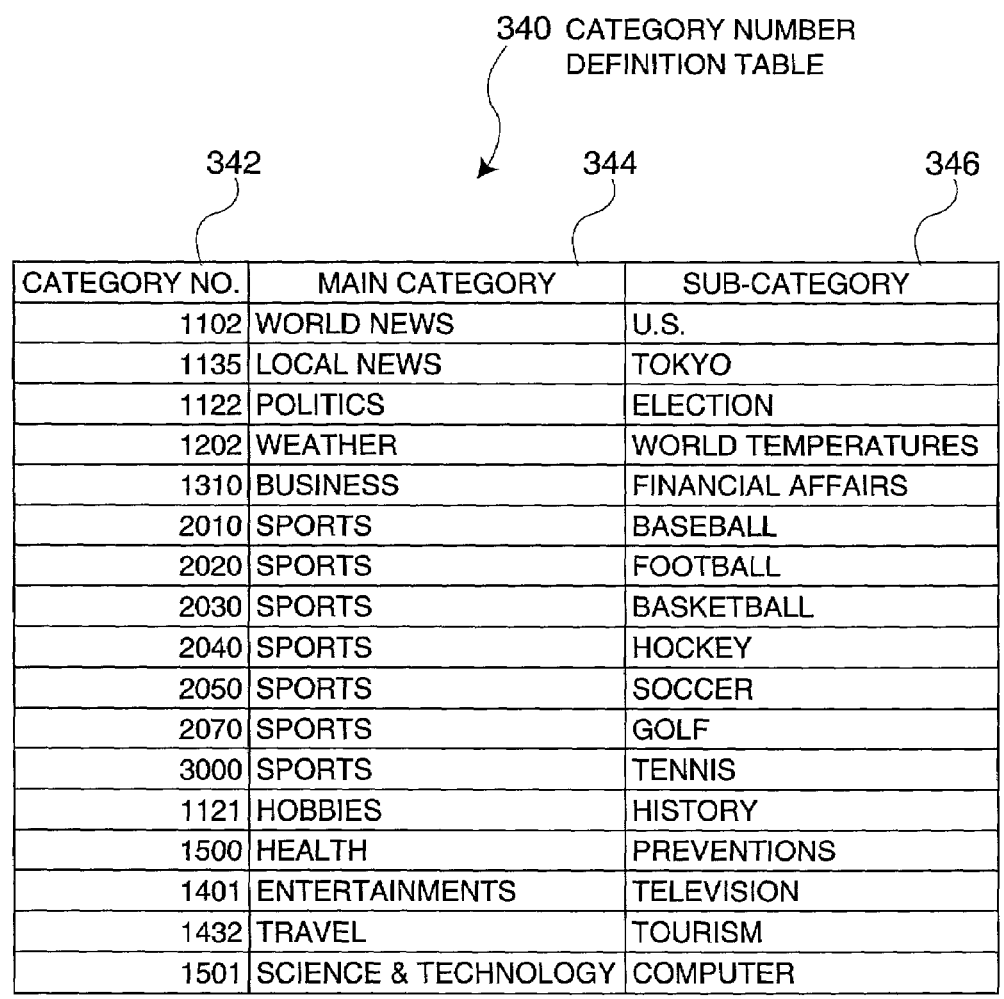

Referring to FIG. 6, the content registration DB 42 stores a category number definition table 340 that shows the relationship between the digital contents supplied from the content providing terminals $S_1$–$S_n$, the main category, the sub-category, and the category number. FIG. 6 shows the digital contents and the data structure of the category number definition table 340.

As shown in FIG. 6(a), the digital contents supplied by the content providing terminals $S_1$–$S_n$ are tagged with the respective category numbers, and the content delivery terminal 100 classifies the digital contents using the category number by category, and registers the classified digital contents in the content registration DB 42. When registering, the content delivery terminal 100 references the category number definition table 340, and adds, besides the category number, the main category, and the sub-category to the digital contents for registration.

Referring to FIG. 6(b), the category number definition table 340 registers a single record in a set of the main category and the sub-category. Each record includes a field 342 for registering a category number, a field 344 for registering a main category, and a field 346 for registering a sub-category. As shown in FIG. 6(b), a first row record registers "1102" as the category number, "WORLD NEWS" as the main category, and "U.S." as the sub-category, and a sixth row record registers "2010" as the category number, "SPORTS" as the main category, and "BASEBALL" as the sub-category.

The construction of the CPU 30 and the process executed by the CPU 30 will be discussed referring to FIG. 7 and FIG. 8.

Figure 7:
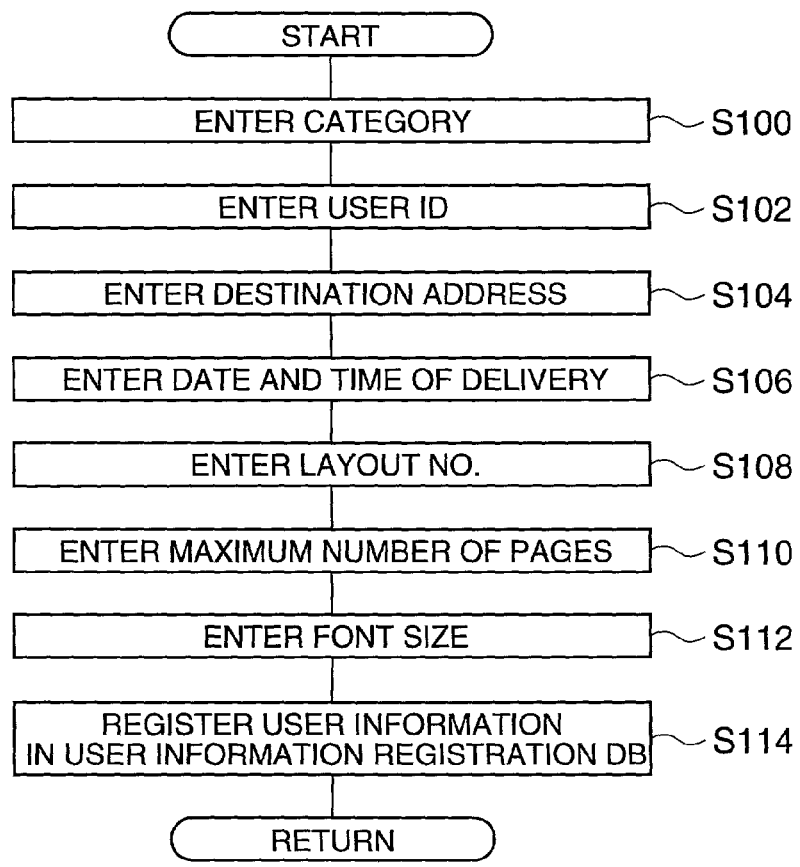
FIG. 7 is a flow diagram illustrating a user registration process.
Figure 8:
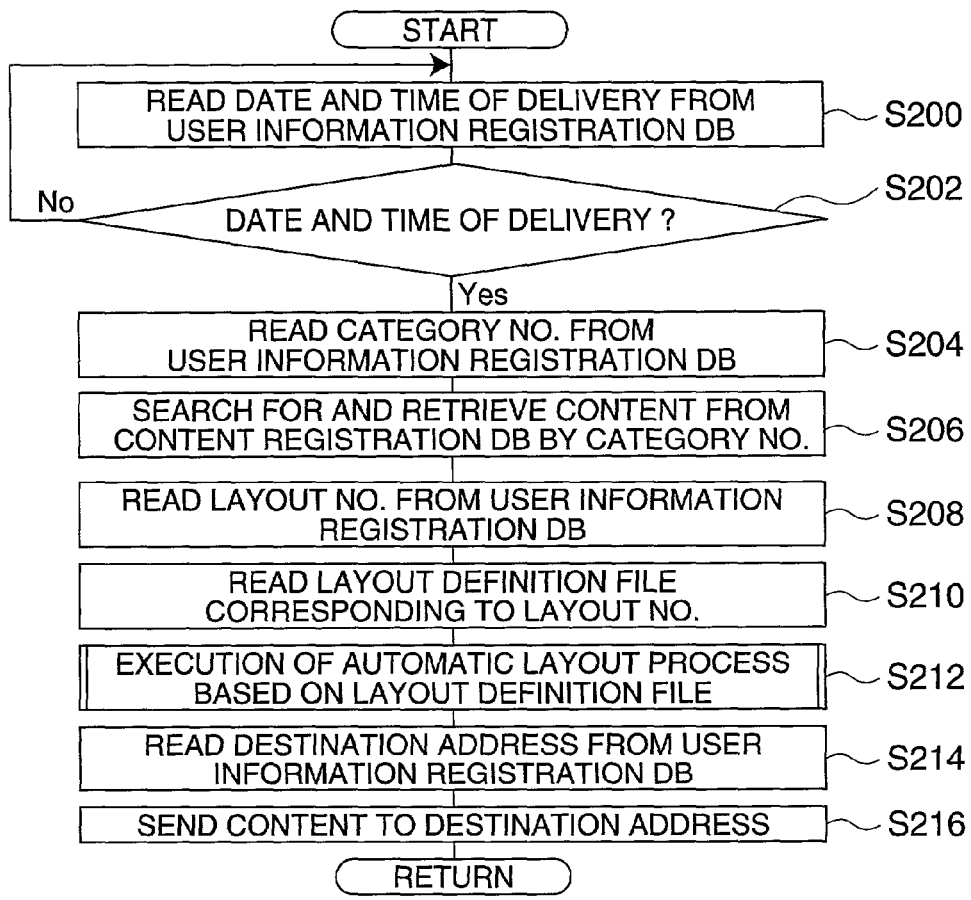
FIG. 8 is a flow diagram illustrating a content delivery process.

The CPU 30, composed of a micro processor unit MPU, starts a predetermined program stored in a predetermined area of the ROM 32, and executes a user registration process and a content delivery process in a time division manner shown in flow diagrams of FIG. 7 and FIG. 8.

Referring to FIG. 7, the user registration process will first be discussed in detail. FIG. 7 is a flow diagram showing an exemplary user registration process.

When the user has accessed the system, the user registration process requests the user to input the required user information such as the user ID, and registers the input user information in the user profile table 300. When the CPU 30 starts, the process goes to step S1100 shown in FIG. 7. An input operation in each of the following steps is performed interactively with the user.

In step S100, the main category and the sub-category are input. In step S102, the user ID and the password are entered. In step S104, the destination address is input, and in step S106, the date and time of delivery are input, and the process proceeds to step S108.

In step S108, the layout number is input. In step S110, the maximum number of pages is input. In step S112, the font size is input. The process proceeds to step S114, where the CPU 30 registers user information input in steps S100–S112 in the user profile table 300. The CPU 30 ends the process, and then returns to the original process.

The content delivery process will now be discussed in detail with reference to FIG. 8. FIG. 8 is a flow diagram showing an exemplary content delivery process.

The content delivery process delivers the digital content to the user terminal 200 by referencing the user profile table 300. Referring to FIG. 8, when the CPU 30 starts, the process proceeds to step S200. The process of the following steps is performed for each record of the user profile table

300. In practice, each step is performed by the number of times equal to the number of records registered in the user profile table 300.

In step S200, the date and time of delivery are read from the user profile table 300. In step S202, the CPU 30 determines, based on the read date and time of delivery, whether it is the day and time on which the digital content must be delivered. When the CPU 30 determines that it is the day and time on which the digital content must be delivered (i.e., Yes), the process proceeds to step S204, and otherwise (i.e., No) the process returns to step S200.

In step S204, the CPU 30 reads the category number from the user profile table 300 and proceeds to step S206. In step S206, the CPU 30 searches for the digital content in the content registration DB 42 in accordance with the read category number, and retrieves the digital content having a category number matching the read category number. The process proceeds to step S208.

In step S208, the CPU 30 reads the layout number from the user profile table 300 and proceeds to step S210. In step S210, the CPU 30 references a layout number definition table 330, and reads the layout definition file corresponding to the read layout number from the user information registration DB 40. In step S212, the CPU 30 performs an automatic layout process in which the output layout of the digital content retrieved in step S206 is determined based on the read layout definition file, and thereby the digital content is produced. The process then proceeds to step S214.

In step S214, the CPU 30 reads the destination address from the user profile table 300 and proceeds to step S216. In step S216, the CPU 30 delivers the produced digital content to the read destination address. The CPU 30 ends the above series of process steps and returns to the original process.

Figure 9:
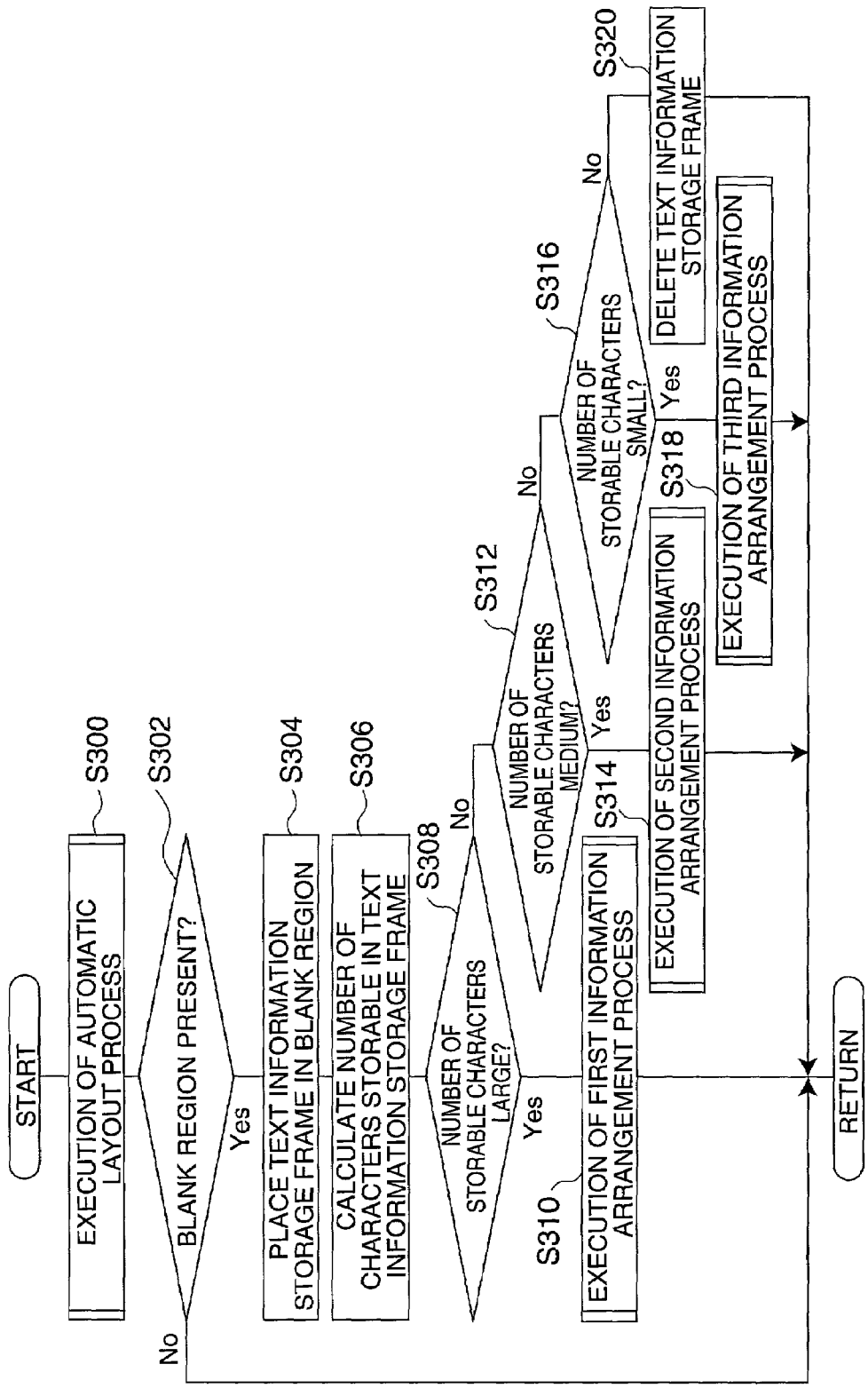
FIG. 9 is a flow diagram illustrating an automatic layout process.

The automatic layout process in step S212 is discussed in more detail below with reference to FIG. 9. FIG. 9 is a flow diagram showing an exemplary automatic layout process.

When the automatic layout process is initiated in step S212, the process proceeds to step S300 as shown in FIG. 9. In step S300, the CPU 30 performs a layout process in which a diversity of pieces of information (such as images and text) forming the digital content retrieved in step S206 is arranged in a predetermined frame in the layout area in accordance with the layout definition file read in step S210. The process then proceeds to step S302.

In step S302, the CPU 30 determines whether a blank region is left in the layout area after the diversity of pieces of information forming the digital content is arranged in the layout area. When it is determined that a blank region is present in the layout area (i.e., Yes), the process proceeds to step S304. The CPU 30 arranges a text information storage frame for storing text information in the blank area and proceeds to step S306. In step S306, the CPU 30 calculates the number of characters storable in the arranged text information storage frame. The process then proceeds to step S308.

In step S308, the CPU 30 determines whether the number of characters storable in the text information storage frame is relatively large (for example, 500 characters or more). When it is determined that the number of storable characters is relatively large (i.e., Yes), the process proceeds to step S310. Instep S310, the CPU 30 performs a first information arrangement process to arrange information in the blank region. The CPU 30 ends the above series of process steps, and returns to the original process. The determination of whether the number of storable characters is large or small may be performed by setting an upper threshold value and a lower threshold value and by using the upper threshold and the lower threshold value as references. The same is true of steps S312 and S316.

When it is determined in step S308 that the number of characters storable in the text information storage frame is not relatively large (i.e., No), the process proceeds to step S312. The CPU 30 determines whether the number of characters storable in the text information storage frame is medium (for example, equal to or more than 250 characters but less than 500 characters). When it is determined that the number of storable characters is medium (i.e., Yes), the process proceeds to step S314. The CPU 30 performs a second information arrangement process to arrange information in the blank region in a method different from that of the first information arrangement process. The CPU 30 thus ends the above series of process steps and returns to the original process.

When it is determined in step S312 that the number of characters storable in the text information storage frame is not medium (i.e., No), the process proceeds to step S316. The CPU 30 determines in step S316 whether the number of characters storable in the text information storage frame is relatively small (for example, equal to or more than 100 characters but less than 250 characters). When it is determined that the number of storable characters is relatively small (i.e., Yes), the process proceeds to step S318. In step S318, the CPU 30 performs a third information arrangement process to arrange information in the blank region in a method different from the methods of the first information arrangement process and the second information arrangement process. The CPU 30 thus ends the above series of process steps and returns to the original process.

When it is determined in step S316 that the number of characters storable in the text information storage frame is very small (for example, less than 100 characters) (i.e., No), the process proceeds to step S320. The CPU 30 deletes the text information storage frame, ends the above series of process steps and returns to the original process.

When it is determined in step S302 that no blank region is present in the layout area (i.e., No), the CPU 30 ends the process and returns to the original process.

Figure 10:
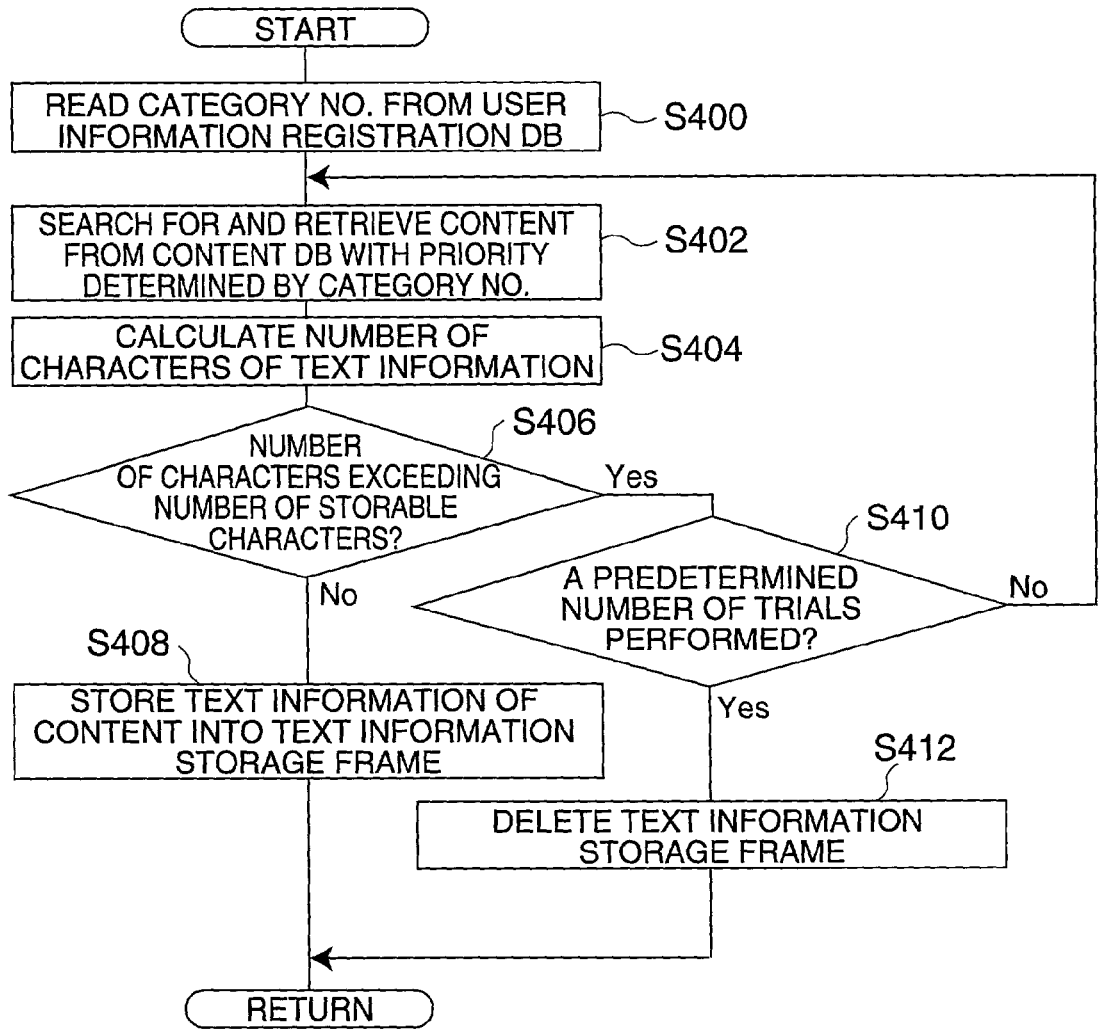
FIG. 10 is a flow diagram illustrating a first information arrangement process.

The first information arrangement process in step S310 is detailed below with reference to FIG. 10. FIG. 10 is a flow diagram showing an exemplary information arrangement process.

Upon being activated in step S310, the first information arrangement process in step S310 proceeds to step S400 as shown in FIG. 10. In step S400, the CPU 30 reads a category number from the user profile table 300, and proceeds to step S402. The CPU 30 searches for and retrieves a digital content in the content registration DB 42 in accordance with a priority order determined by the read category number, and proceeds to step S404. In step S404, the CPU 30 calculates the number of characters of the text information contained in the retrieved digital content. The process proceeds to step S406.

In step S406, the CPU 30 determines whether the calculated number of characters of the text information exceeds the number of characters storable in the text information storage frame. When it is determined that the calculated number of characters does not exceed the number of characters storable in the text information storage frame (i.e., No), the process proceeds to step S408. In step S408, the CPU 30 stores the text information contained in the digital content into the text information storage frame, ends this series of process steps and returns to the original process.

When it is determined in step S406 that the calculated number of characters of the text information exceeds the number of characters storable in the text information storage frame (i.e., Yes), the process proceeds to step S410. The CPU 30 determines in step S410 whether searching for the digital content has been performed by a predetermined number of times in step S402. When it is determined that searching for the digital content has been performed by a predetermined number of times (i.e., Yes), the process proceeds to step S412. In step S412, the CPU 30 deletes the text information storage frame, ends this series of process steps and returns to the original process.

When it is determined that searching for the digital content has not been performed by a predetermined number of times (i.e., No), the process proceeds to step S402.

Figure 11:
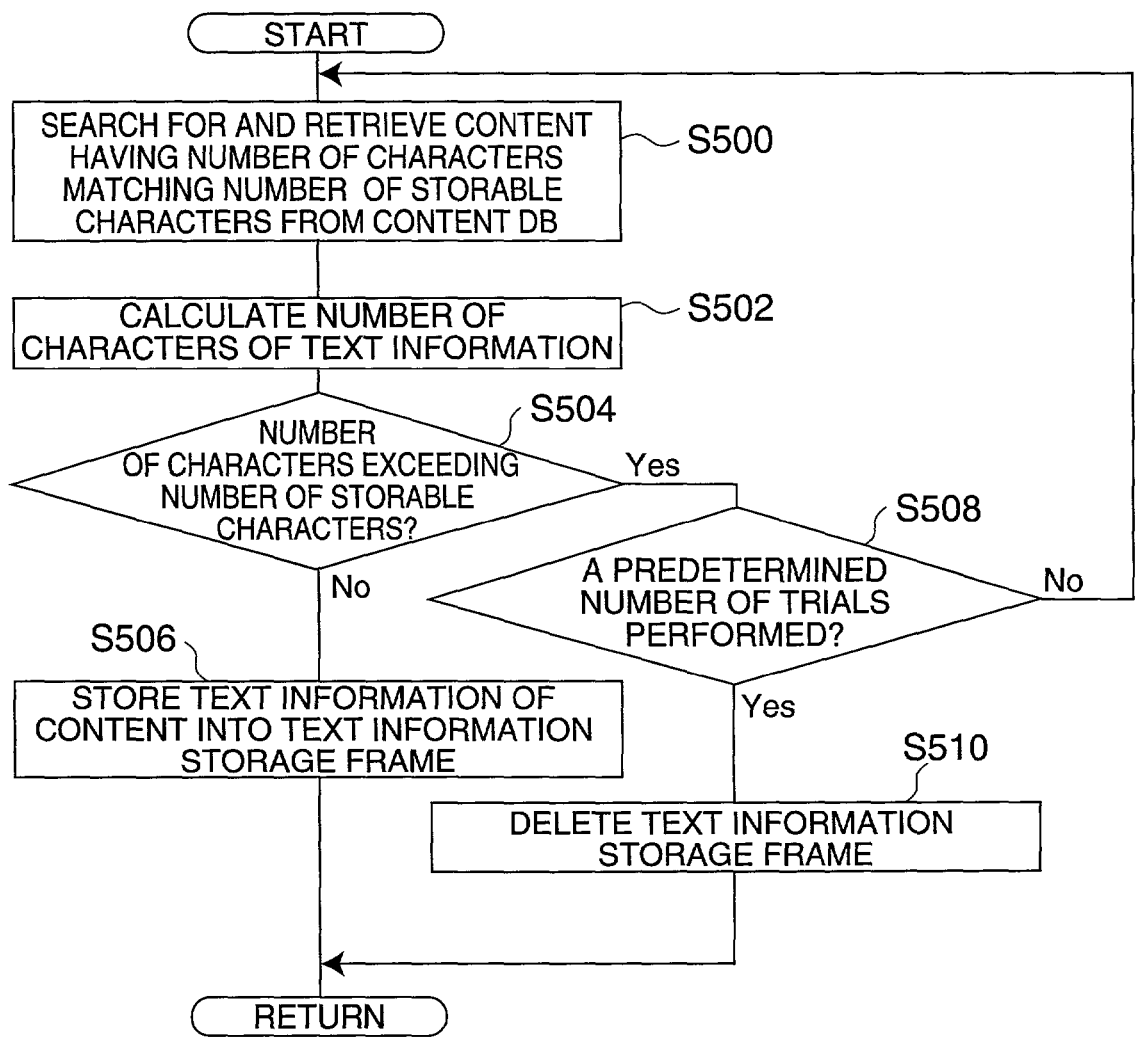
FIG. 11 is a flow diagram illustrating a second information arrangement process.

The second information arrangement process in step S314 is detailed below with reference to FIG. 11. FIG. 11 is a flow diagram of an exemplary second information arrangement process.

Upon being activated, the second information storage frame in step S314 proceeds to step S500 as shown in FIG. 11. In step S500, the CPU 30 searches for a digital content in the content registration DB 42, thereby retrieving the digital content containing text information having the number of characters matching the number of characters storable in the text information storage frame. The process proceeds to step S502. The CPU 30 calculates the number of characters of the text information contained in the retrieved digital content. The process proceeds to step S504.

In step S504, the CPU 30 determines whether the calculated number of characters of the text information exceeds the number of characters storable in the text information storage frame. When it is determined that the calculated number of characters of the text information does not exceed the number of characters storable in the text information storage frame (i.e., No), the process proceeds to step S506. The CPU 30 stores the text information contained in the digital content into the text information storage frame, ends this series of process steps and returns to the original process.

When it is determined in step S504 that the calculated number of characters of the text information exceeds the number of characters storable in the text information storage frame (i.e., Yes), the process proceeds to step S508. The CPU 30 determines whether searching for the digital content has been performed by a predetermined number of times in step S500. When it is determined that searching for the digital content has been performed by a predetermined number of times (i.e., Yes), the process proceeds to step S510. The CPU 30 deletes the text information storage frame, ends this series of process steps and returns to the original process.

When it is determined in step S508 that searching for the digital content has not been performed by a predetermined number of times (i.e., No), the process proceeds to step S500.

Figure 12:
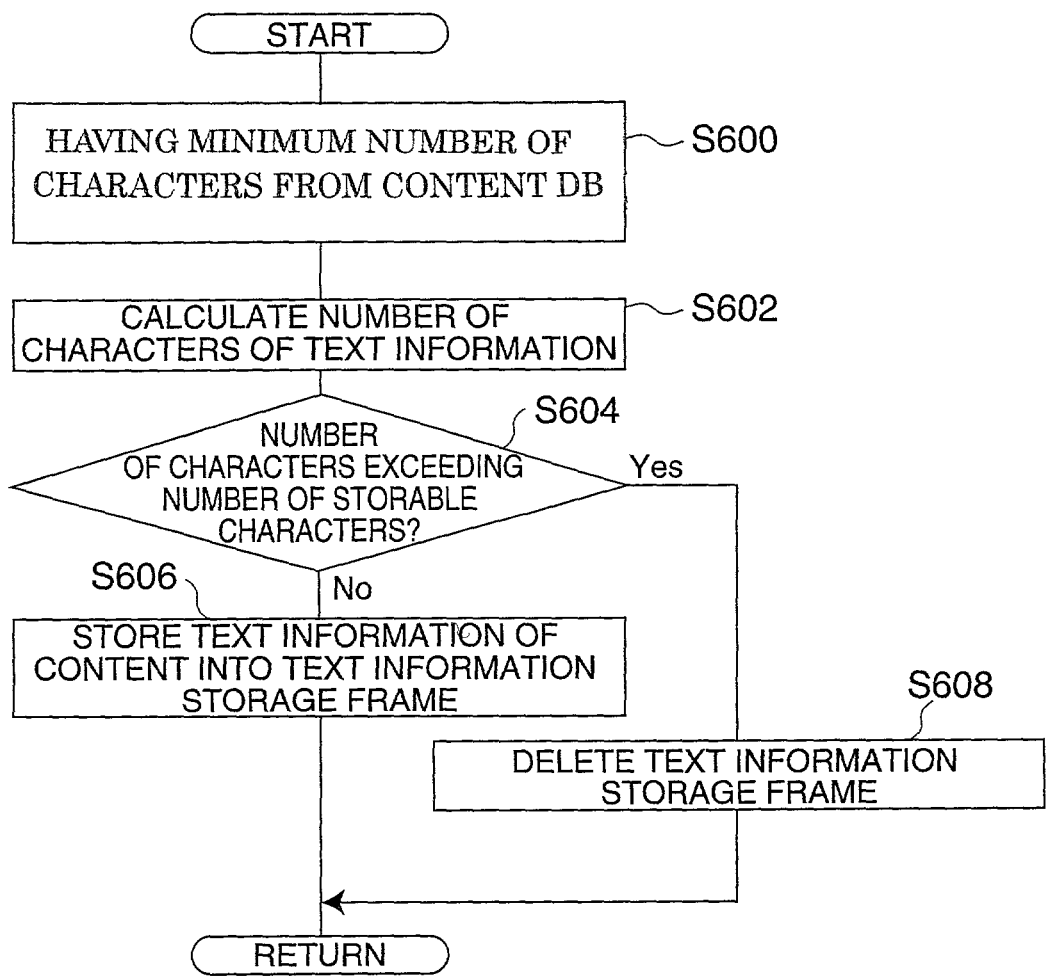
FIG. 12 is a flow diagram illustrating a third information arrangement process.

The third information arrangement process in the step S318 is detailed below with reference to FIG. 12. FIG. 12 is a flow diagram illustrating an exemplary third information arrangement process.

Upon being activated in step S318, the third information arrangement process proceeds to step S600 as shown in FIG. 12. In step S600, the CPU 30 searches for and retrieves a digital content containing text information that forms sentences with a minimum number of characters in the content registration DB 42. The process proceeds to step S602. The CPU 30 calculates the number of characters of the text information contained in the retrieved digital content, and then proceeds to step S604.

In step S604, the CPU 30 determines whether the calculated number of characters of the text information exceeds the number of characters storable in the text information storage frame. When it is determined that the calculated number of characters of the text information does not exceed the number of characters storable in the text information storage frame (i.e., No), the process proceeds to step S606. The CPU 30 stores the text information contained in the digital content into the text information storage frame, ends this series of process steps and then returns to the original process.

When it is determined that the calculated number of characters of the text information exceeds the number of characters storable in the text information storage frame (i.e., Yes), the process proceeds to step S608. The CPU 30 deletes the text information storage frame, ends this series of process steps and then returns to the original process.

The operation of the above-referenced embodiment will now be discussed.

The process of registering information required to deliver the digital content is first discussed below.

When the user desires a digital content, the user accesses a content delivery terminal 100 at a user terminal 200 using a WWW browser, and then inputs a user registration request.

When the user terminal 200 receives the user registration request, the user terminal 200 requests the user to input required user information in communication with the content delivery terminal 100. In response to the request, the user inputs, as the user information, a main category, a sub-category, a user ID, a password, a destination address, the date of delivery, the time of delivery, a layout number, the maximum number of pages, and a font size. The user information is then sent to the content delivery terminal 100.

Upon receiving the user information together with the registration request, the content delivery terminal 100 registers the received user information in the user profile table 300 after process steps S100–S114.

The process of delivering a digital content is discussed below referring to the user profile table 300.

When it is the day and time for the content delivery terminal 100 to deliver the digital content by referencing the user profile table 300, the CPU 30 performs process steps in S204 and S206. The CPU 30 therefore reads the category number from the user profile table 300 and searches for digital contents in the content registration DB 42, based on the read category number, thereby retrieving a digital content having a category number identical to the read category number. Through process steps S208–S212, the CPU 30 reads a layout number from the user profile table 300, and references a layout number definition table 330, thereby reading a layout definition file corresponding to the read layout number from the user information registration DB 40. The CPU 30 determines an output layout for the retrieved digital content based on the read layout definition file, and produces a digital content.

In the layout process, the CPU 30 arranges a variety of pieces of information forming a digital content in a predetermined frame in the layout area in step S300. As a result, when the blank region is present in the layout area, the text information storage frame is arranged in the blank region and the number of characters storable in the text information storage frame is calculated through steps S304 and S306.

When the number of characters storable in the text information storage frame is relatively large, the information is arranged into the blank region through the first information arrangement process in steps S308 and S310. Specifically, the CPU 30 reads the category number in the user profile table 300, and searches for and retrieves the digital content in the content registration DB 42 in accordance with the priority order determined by the read category number in steps S400 and S402. When the number of characters of the text information contained in the retrieved digital content does not exceed the number of characters storable in the text information storage frame, the text information is stored into the text information storage frame in steps S406 and S408. On the other hand, when the number of characters of the text information contained in the digital content exceeds the number of characters storable in the text information storage frame, selection of digital contents is performed by a predetermined number of times in steps S406 and S410.

When the calculation result in step S306 shows that the number of characters storable in the text information storage frame is medium, the information is arranged into the blank region in the method of the second information arrangement process through steps S312 and S314, different from the method of the first information arrangement process. Specifically, the digital content containing the text information having the number of characters matching the number of characters storable in the text information storage frame is retrieved from the content registration DB 42 in steps S500–S506. The text information contained in the retrieved digital content is stored into the text information storage frame.

When the calculation result in step S306 shows that the number of characters storable in the text information storage frame is relatively small, the information is arranged into the blank region in the method of the third information arrangement process through steps S316 and S318, different from the methods of the first and second information arrangement processes. Specifically, the digital content containing the text information that forms sentences with the smallest number of characters is retrieved from the content registration DB 42 in steps S600–S606. The text information contained in the retrieved digital content is stored into the text information storage frame.

When the calculation result in step S306 shows that the number of characters storable in the text information storage frame is very small, the text information storage frame is deleted in step S302. In this case, the automatic layout process is completed without arranging anything in the blank storage frame.

The destination address is read from the user profile table 300 in steps S212 and S214, and the produced digital content is then sent to the read destination address.

In accordance with the present embodiment, when the blank region is present in the layout area after a variety of pieces of information forming the digital content are arranged in the layout area, the content delivery terminal 100 arranges the text information storage frame in the blank region, searches for and retrieves the digital content in the content registration DB 42 in accordance with the predetermined priority order, stores the text information into the text information storage frame when the number of characters of the text information contained in the digital content does not exceed the number of characters storable in the text information storage frame, and performs again selection of a digital content when the number of characters of the text information contained in the digital content exceeds the number of characters storable in the text information storage frame.

As a result, the text information contained in the digital content having a relatively high priority is arranged into the blank region without modifying the font size and pitches thereof. In contrast to the conventional art, information can be stored into the blank region present in the layout area without destroying layout consistency too much. The information is stored into the blank region while maintaining priority order.

In accordance with the present embodiment, when the blank region is present in the layout area after a variety of pieces of information forming the digital content are arranged in the layout area, the content delivery terminal 100 arranges the text information storage frame in the blank region, searches for and retrieves the digital content containing the text information having the number of characters matching the number of characters storable in the text information storage frame in the content registration DB 42, and stores the text information contained in the digital content into the text information storage frame.

As a result, the text information having the number of characters matching the number of characters storable in the text information storage frame can be arranged into the blank region without modifying the font size and the pitches thereof. In contrast to the conventional art, information is arranged into the blank region present in the layout area without destroying layout consistency too much. The finished layout of the whole page is thus aesthetically pleasing.

In accordance with the present embodiment, when the blank region is present in the layout area after a variety of pieces of information forming the digital content are arranged in the layout area, the content delivery terminal 100 arranges the text information storage frame in the blank region, searches for and retrieves the digital content containing the text information that forms sentences with the smallest number of characters in the content registration DB 42, and stores the text information contained in the digital content into the text information storage frame.

As a result, the text information having the smallest number of characters is arranged into the blank region without modifying the font size and the pitches thereof. In contrast to the conventional art, information is arranged into the blank region present in the layout area without destroying layout consistency too much. A large amount of information is arranged into the blank region.

In accordance with the present embodiment, when the blank region is present in the layout area after a variety of pieces of information forming the digital content are arranged in the layout area, the content delivery terminal 100 selects one of the first through third information arrangement processes for arranging information into the blank region through respective different methods, based on the size of the blank region, and arranges the information into the blank region through the selected information arrangement process.

Since information is arranged into the blank region in a method which is different depending on the size of the blank region, it is possible to arrange an appropriate amount of information matching the size of the blank region. In contrast to the conventional art, the information is arranged into the blank region present in the layout area without destroying layout consistency as much.

The content delivery terminal 100 in this embodiment searches for and retrieves the digital content in the content registration DB 42 based on the user information in the user information registration DB 40.

Since unique information about a user and information designated by the user are referenced in the selection of the digital content, the digital content relatively satisfying to the user is thus produced.

The content delivery terminal 100 in this embodiment determines the output layout of the digital content based on the user information in the user information registration DB 40, before producing the digital content.

Since unique information about the user and information designated by the user are referenced in the determination of the output layout, the digital content relatively satisfying to the user is thus produced.

Figure 13:
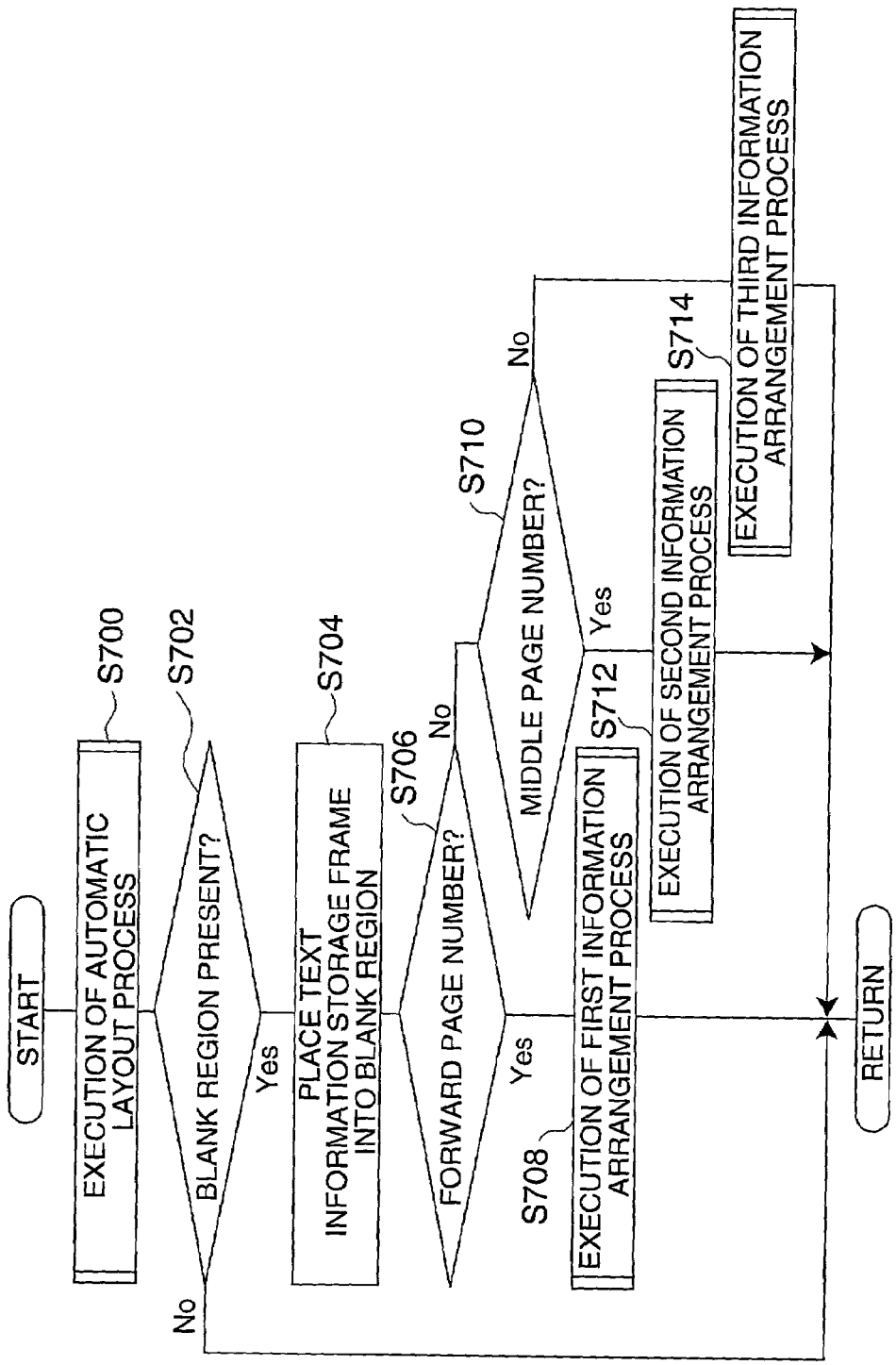
FIG. 13 illustrates an automatic layout process.

In the above embodiment, one of the first through third information arrangement processes is retrieved according to the size of the blank region, and the information is stored into the blank region through the retrieved information arrangement process. The present invention is not limited to this arrangement. Alternatively, one of the first through third information arrangement processes is retrieved based on the page information relating to the page of the layout area in which the blank region is present, and the information is arranged into the blank region through the retrieved information arrangement process. Specifically, the automatic layout process illustrated by the flow diagram in FIG. 13 is performed. FIG. 13 is a flow diagram of an exemplary automatic layout process.

Upon being activated in step S212, the automatic layout process proceeds to step S700 as shown in FIG. 13. In step S700, the automatic layout process is executed in which a variety of pieces of information forming a digital content retrieved in step S206 is arranged in a predetermined frame in the layout area based on the layout definition file read in step S210. The process then proceeds to step S702.

In step S702, the CPU 30 determines whether a blank region is present in the layout area after the variety of pieces of information forming the digital content is arranged in the layout area. When it is determined that the blank region is present in the layout area (i.e., Yes), the process proceeds to step S704, and the text information storage frame is arranged in the blank region, and the process proceeds to step S706. In step S706, the number of characters storable in the arranged text information storage frame is calculated, and the process proceeds to step S708.

In step S706, the CPU 30 determines whether the page number of a page bearing the layout area having the blank region is relatively forward. When it is determined that the page number is relatively forward (i.e., Yes), the process proceeds to step S708. The first information arrangement process in steps S400–S412 is performed. The CPU 30 ends the series of process steps and then returns to the original process. The determination of whether the page number is relatively forward is performed by setting an upper threshold value and a lower threshold value and by using the upper threshold value and the lower threshold value as references. The same is true of step S712.

When it is determined in step S706 that the page number of the layout area with the blank region is not relatively forward (i.e., No), the process proceeds to step S710. In step S710, the CPU 30 determines whether the page number of the layout area having the blank region is medium. When it is determined that the page number of the layout area having the blank region is medium (i.e., Yes), the process proceeds to step S712. The CPU 30 performs the second information arrangement process in steps S500–S510 and returns to the original process.

When it is determined in step S710 that the page number of the layout area having the blank region is not medium (i.e., No), the process proceeds to step S714. Since the page number is relatively backward, the CPU 30 performs the third information arrangement process in steps S600–S608, and ends the series of process to return to the original process.

When it is determined in step S702 that no blank region is present in the layout area (i.e., No), the CPU 30 ends the process and returns to the original process.

Since the information is stored into the blank region through a different method depending on the page of the layout area, it is possible to arrange the information appropriate for the page bearing the layout area containing the blank region. The information is thus arranged into the blank region present in the layout area in a manner easy to read.

In the above embodiment, the first through third information arrangement processes illustrated in FIG. 10 through FIG. 12 are adopted as the process for arranging the information into the blank region. However, it should be understood that the present invention is not limited to this arrangement. For example, the content delivery terminal 100 may include an advertisement information storage DB storing advertisement information. When a blank region is present in the layout area after a variety of pieces of information forming the digital content are arranged in the layout area, an advertisement information storage frame for storing advertisement information is arranged in the blank region, the advertisement information is searched for and retrieved from the advertisement information registration DB, and the retrieved advertisement information is stored into the advertisement information storage frame.

In the above embodiment, the text information storage frame is deleted when the number of characters storable in the text information storage frame is very small. The present invention is not limited to this arrangement. When the number of characters storable in the text information storage frame is very small, the bonus information (the advertisement information or information beneficial for the user) having the amount of information matching the number of characters of the text information storage frame may be stored into the text information storage frame.

In the above embodiment, the text information is not stored into the text information storage frame in each of the first through third information arrangement processes when the number of characters of the text information contained in the retrieved digital content exceeds the number of characters of the text information storage frame. The present invention is not limited to this arrangement. A portion of the text information, contained in the digital content, having the number of characters matching the number of characters of the text information storage frame, is stored in the text information storage frame, and the remainder of the text information is discarded or stored into another layout area.

One of the first through third information arrangement processes is selected based on the size of the blank region in the above embodiment. The following preferred combinations may be used wherein the first information arrangement process corresponds to a method of selecting in terms of a document priority order, the second information arrangement process corresponds to a method of selecting in terms of an area matching, and the third information arrangement process corresponds to a method of selecting in terms of the minimum document. Each method is described in greater detail below.

First, when the blank region is "small" in size, the digital content is selected by using the method of selecting in terms of minimum document, the text information contained in the selected digital content is stored into the text information storage frame, and the remainder that cannot be stored is discarded. When the blank region is "medium" in size, the digital content is selected by using the method of selecting in terms of an area matching, the text information contained in the digital content is stored into the text information storage frame, and the remainder that cannot be stored is posted on an end page. When the blank region is "large" in size, the digital content is selected by using the method of selecting in terms of document priority order, the text information contained in the selected digital content is stored into the text information storage frame, and the remainder that cannot be stored is posted on a next page.

Second, when the blank region is "small" in size, the advertisement information is selected in the advertisement information registration DB, and the selected advertisement information is stored into the text information storage frame. When the blank region is "medium" in size, the digital content is selected by using the method of selecting in terms of document priority order, the text information contained in the selected digital content is stored into the text information storage frame, and the remainder of the text information that cannot be stored is posted on a next page. When the blank region is "large" in size, the digital content is selected by using the method of selecting in terms of document priority order, the text information contained in the selected digital content is stored into the text information storage frame, and the remainder of the text information that cannot be stored is posted on a next page.

When the information arrangement process is performed based on the page information, the following combinations are contemplated.

First, to produce a first page in an aesthetically pleasing layout, the digital content is selected by using the method of selecting in terms of an area matching, and the text information contained in the selected digital content is stored into the text information storage frame. On the subsequent pages, the digital content is selected through the method of selecting in terms of document priority order, and the text information contained in the selected digital content is stored into the text information storage frame.

Second, to post information as much as possible on a first page, the digital content is selected by using method of selecting in terms of the minimum document, and the text information contained in the selected digital content is stored into the text information storage frame. On the subsequent pages, the digital content is selected by using the method of selecting in terms of document priority order, and the text information contained in the selected digital content is stored into the text information storage frame.

Third, up to page 5, the digital content is selected through the method of selecting in terms of document priority order, and the text information contained in the selected digital content is stored into the text information storage frame. To post as many articles as possible on the subsequent pages, the digital content is selected by using the method of selecting in terms of minimum document, and the text information contained in the selected digital content is stored into the text information storage frame.

In this way, the selection method is set beforehand both in the case of selecting a process based on the blank region and the case of selecting a process based on the page information. Alternatively, the selection method may be registered as the user information in the user profile table 300.

The text information contained in the digital content is stored into the text information storage frame in the above embodiment in this way. When another blank region is still present after the text information is stored into the text information storage frame, a text information storage frame is arranged in the other remaining blank region. This process is repeated until no blank regions are present.

The output layout of the digital content is determined based on the user information in the above-referenced embodiment. However, it should be understood that the present invention is not limited to this arrangement. The output layout of the digital content may be determined based on the number of images contained in the digital content or the amount of text information contained in the digital content.

Accordingly, the output layout can be easily seen even when the number of images contained in the digital content or the amount of text information contained in the digital content is large or even when the number of images contained in the digital content or the amount of text information contained in the digital content is small.

In the above-referenced embodiment, the content delivery terminal 100 performs the automatic layout process in step S212. However, it should be understood that the present invention is not limited to this arrangement. Alternatively, the user terminal 200 may perform the automatic layout process. In this way, the workload imposed on the content delivery terminal 100 is lightened.

In the above-referenced embodiment, the first through third information arrangement processes are employed as a process for arranging information into a blank region. However, it should be understood that the present invention is not limited to this arrangement. A document, which belongs to the same category as that of the document already arranged in the layout area, may be arranged in the blank region. Specifically, the category of the document already arranged in the same layout area is examined, the digital content containing the document in that category is searched for and retrieved from the content registration DB 42, and the retrieved digital content is stored into the text information storage frame in the blank region. When a plurality of documents is present in the same category, the documents in the same category are narrowed down by using one of the method of selecting in terms of a minimum document, the method of selecting in terms of an area matching, and the method of selecting in terms of a document priority order. When no document is present in the same category, a document is selected by using one of the method of selecting in terms of a minimum document, the method of selecting in terms of an area matching, and the method of selecting in terms of document priority order.

It is thus expected that the documents in the same category are arranged in the same layout area.

In the above-referenced embodiment, one of the first through third information storage frames is selected based on the size of the blank region. However, it should be understood that the present invention is not limited to this arrangement. The following preferred selection methods are contemplated.

One of the first through third information arrangement processes can be selected based on the location of the blank region in the layout area. The user typically views first the top portion of each page. When a blank region occurs on the top half portion of a page above the center of the page, a document is selected by using the method of selecting in terms of a document priority order. When a blank region occurs on the bottom half of the page below the center of the page, a document is selected by using the method of an area matching, because the document becomes difficult to read if the document is continued to a next column or a next page.

Figure 14:
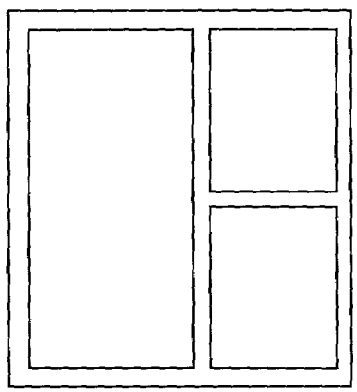
FIG. 14 illustrates a layout area.
Figure 14:
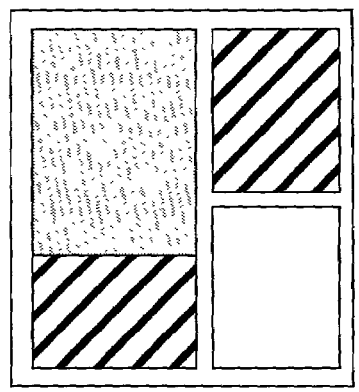

When blank regions occur in the bottom left portion and the top right portion of the layout area after an article is arranged in a gray region as shown in FIG. 14(b) in contrast to a text information storage frame shown in FIG. 14(a), and when the same document is laid out straddling the two columns from the bottom left portion to the top right portion of the page (in areas hatched by bold lines in FIG. 14(b), the document thus becomes difficult to read). FIGS. 14(a) and 14(b) show the layout areas.

The user typically views first the left portion of the page (the right portion of the page in typical Japanese vertical writing style). When a blank region occurs in the left half portion of the page, a document is selected by using the method of selecting in terms of a document priority order.

Since a different method is used depending on the location of the blank region in the layout area to arrange information in the blank region, information appropriate for the location of the blank region in the layout area is arranged into the blank region. In comparison with the conventional art, the information arranged into the blank region present in the layout area is easy to read.

Second, one of the first through third information arrangement processes is selected based on the shape of the blank region. An elongated blank region, i.e., having one of the vertical side and the horizontal side thereof substantially longer than the other, catches less the eye of the user. The blank region preferably stores a document matching the size thereof rather than storing an important document. To this end, a document is selected by using the method of selecting in terms of an area matching when the blank region is an elongated one. When the blank region has a balanced aspect ratio, a document is selected by using the method of selecting in terms of document priority order.

Since a different method is used depending on the shape of the blank region to arrange information in the blank region, information appropriate for the shape of the blank region is arranged into the blank region. In comparison with the conventional art, the information arranged into the blank region present in the layout area is easy to read.

Third, one of the first through third information arrangement processes is selected based on the designated upper limit of pages. When the designated upper limit of the pages is small, a document is selected by using the method of selecting in terms of a minimum document to post the document as much as possible. When the designated upper limit of the pages is large, a document is selected by using the method of selecting in terms of document priority order.

Since a different method is used depending on the designated upper limit of the pages to arrange information in the blank region, information appropriate for the designated upper limit of the pages is arranged into the blank region. In comparison with the conventional art, the information arranged into the blank region present in the layout area is easy to read.

Fourth, one of the first through third information arrangement processes is selected based on the number of elements in a document list. When the document list includes too many document candidates to be posted, the system preferably posts documents having a high priority rather than posting many types of documents. A document is thus selected by using the document priority order selection method. When the number of documents in the document list is small enough for all documents to be posted, each document is selected by using the method of selecting in terms of an area matching from the aesthetical point of view.

Since a different method is used depending on the number of elements in the document list to arrange information into the blank region, information appropriate for the number of elements in the document list is arranged into the blank region. In comparison with the conventional art, the information arranged into the blank region present in the layout area is easy to read.

Fifth, one of the first through third information arrangement processes is selected depending on the time of delivery or the date and time of delivery. When a time period, within which the digital content is delivered, is in the morning, a document is selected by using the method of selecting in terms of a minimum document to provide information as much as possible within a short period of time. When the time period is in the evening or in the night, a document is selected by using method of selecting in terms of the area matching. Since more time is available for the user to read the document delivered in the evening or in the night, an aesthetical pleasing layout becomes important.

Since a different method is used depending on the time of delivery or the date and time of delivery to arrange information in the blank region, information appropriate for the time of delivery or the date and time of delivery is arranged into the blank region. In comparison with the conventional art, the information stored into the blank region present in the layout area is easy to read.

Sixth, one of the first through third information arrangement processes is selected based on the location of the user, such as the address of the user. If an aesthetically pleasing layout is preferred in the area of the location of the user, a document is selected by using the method of selecting in terms of an area matching. When a number of pieces of information, rather than an aesthetically pleasing layout, is demanded in the area of the location of the user, a document is selected by using the method of selecting in terms of a minimum document.

Since a different method is used depending on the location of the user to arrange information in the blank region, information appropriate for the location of the user is arranged into the blank region. In comparison with the conventional art, the information stored into the blank region present in the layout area is easy to read.

When a category is assigned to each layout area, the blank region stores a document falling within the same category as that assigned to the layout area.

Since a digital content containing the text information having the number of characters matching the number of characters storable in the text information storage frame is searched for and retrieved from the content registration DB 42, the number of characters of the text information does not normally exceed the number of characters storable in the text information storage frame. However, when the text information is actually stored into the text information storage frame, space may be added as a result of a word wrapping process or a justification process and the number of characters becomes larger than the actual number of characters during layout. In this case, even if the text information having the number of characters matching the number of characters storable in the text information storage frame is searched for and retrieved, the text information may be overflown from the text information storage frame. In such a case, a digital content containing text information having the number of characters smaller than the above-mentioned number of characters and second best matching the number of characters storable in the text information storage frame is searched for and retrieved, or a digital content is selected by using the method of selecting in terms of minimum document.

In the above-referenced embodiment, the processes shown in the flow diagrams in FIG. 8 through FIG. 13 are performed by executing a control program stored beforehand in the ROM 32. However, it should be understood that the present invention is not limited to this. Before being executed, the control program for these process steps may be read from a storage medium into the RAM 34.

The storage medium may be a semiconductor storage medium such as an RAM, an ROM, etc, a magnetic storage medium such as an FD, an HD, etc, an optical reading-type storage medium such as a CD, a CDV, an LD, a DVD, etc., or a magnetooptical storage medium such as an MO, etc. The storage medium is thus any computer readable storage medium that permits data to be read electronically, magnetically, or optically.

In the above embodiment, the digital content production system and the digital content production program of the present invention are implemented in a network system including the Internet 199. The present invention is not limited to this arrangement. Alternatively, the present invention may be applied to a so-called intranet that performs communication in the same method as that of the Internet 199. However, the present invention is not limited to a network that performs communication in the same method as that of the Internet 199, and may be applied to an ordinary network.

In the digital content production system and the digital content production program of the above embodiment of the present invention, the content delivery terminal 100 delivers digital contents such as news to the user terminal 200 as shown in FIG. 1. The present invention is not limited to this arrangement, and may be applied to other occasions without departing from the scope and spirit of the present invention.

In accordance with the digital content production system of the present invention, the text information contained in the digital content having a relatively high priority is arranged into the blank region without modifying the font size, and the pitches of the text information. In contrast to the conventional art, information is arranged into the blank region present in the layout area without destroying layout consistency too much.

In accordance with the digital content production system of the present invention, the text information having the number of characters matching the number of characters storable in the text information storage frame is arranged into the blank region without modifying the font size, and the pitches of the text information. In contrast to the conventional art, information is arranged into the blank region present in the layout area without destroying layout consistency too much.

In accordance with the digital content production system of the present invention, the text information having the smallest number of characters is arranged into the blank region without modifying the font size and the pitches of the text information. In contrast to the conventional art, information is stored into the blank region present in the layout area without destroying layout consistency too much.

In accordance with the digital content production system of the present invention, information is arranged into the blank region by using a different method depending on the size of the blank region. The information having a relatively appropriate amount for the size of the blank region is thus arranged into the blank region. In contrast to the conventional art, information is arranged into the blank region present in the layout area without destroying layout consistency too much.

In accordance with the digital content production system of the present invention, information is arranged into the blank region by using a different method depending on the page of the layout area. The information having a content appropriate for the page of the layout area to which the blank region belongs is thus arranged into the blank region. In comparison with the conventional art, the information arranged into the blank region present in the layout area is easy to read.

In accordance with the digital content production system of the present invention, information is arranged into the blank region by using a different method depending on the location of the blank region in the layout area. The information having a content appropriate for the location of the blank region in the layout area is thus arranged into the blank region. In comparison with the conventional art, the information arranged into the blank region present in the layout area is easy to read.

In accordance with the digital content production system of the present invention, information is arranged into the blank region by using a different method depending on the shape of the blank region in the layout area. The information having a content appropriate for the shape of the blank region is thus arranged into the blank region. In comparison with the conventional art, the information arranged into the blank region present in the layout area is easy to read.

In accordance with the digital content production system of the present invention, information is stored into the blank region by using a different method depending on the designated upper limit of the number of pages. The information having a content appropriate for the designated upper limit of the number of pages is thus arranged into the blank region. In comparison with the conventional art, the information arranged into the blank region present in the layout area is easy to read.

In accordance with the digital content production system of the present invention, information is arranged into the blank region by using a different method depending on the number of selected digital contents. The information having a content appropriate for the number of selected digital contents is thus arranged into the blank region. In comparison with the conventional art, the information arranged into the blank region present in the layout area is easy to read.

In accordance with the digital content production system of the present invention, information is arranged into the blank region by using a different method depending on the time of delivery or the date and time of delivery of the digital content. The information having a content appropriate for the time of delivery or the date and time of delivery is thus arranged into the blank region. In comparison with the conventional art, the information arranged into the blank region present in the layout area is easy to read.

In accordance with the digital content production system of the present invention, information is arranged into the blank region by using a different method depending on the location of the user. The information having a content appropriate for the location of the user is thus arranged into the blank region. In comparison with the conventional art, the information arranged into the blank region present in the layout area is easy to read.

The digital content production system of the present invention allows the user to obtain beneficial information, thereby improving the quality of the service to the user.

Furthermore, since unique information about a user and information designated by the user are referenced in the selection of the digital content in accordance with the digital content production system of the present invention as recited in claim 16, the digital content relatively satisfying to the user is thus produced.

Since unique information about the user and information designated by the user are referenced in the determination of the output layout of the digital content in accordance with the digital content production system of the present invention, the digital content with an output layout relatively satisfying to the user is thus produced.

What is claimed is:

1. A digital content production system, comprising:
a content storage device that stores registered digital contents;
a content selection device that selects digital contents for arrangement in the content storage device; and
a content production device that produces the digital content for output by determining an output layout of the digital contents for arrangement selected by the content selection device, the content production device produces the digital content for output by arranging information forming the digital contents for arrangement into a predetermined frame in a layout area,
when a blank region containing no information arranged therewithin is present in the layout area after the information forming the digital contents for arrangement is arranged in the layout area, one of a plurality of information arrangement processes for arranging information into the blank region through respective different methods is selected based on a size of the blank region, and information is arranged into the blank region through the selected information arrangement process,
a first information arranging process, which selects and stores the digital content based on a priority of the digital content, is selected when a number of characters storable in the blank region is in a first range of storable characters,
a second information arranging process, which selects and stores digital content based on the number of characters storable in the blank region, is selected when the number of characters storable in the blank region is in a second range of storable characters that is less than the first range,
and a third information arranging process, which selects and stores the digital content including text information with a minimum number of characters, is selected when the number of characters storable in the blank region is in a third range of storable characters that is less than the second range.

2. A digital content production system, comprising:
a content storage device that stores registered digital contents;
a content selection device that selects digital contents for arrangement in the content storage device; and
a content production device that produces the digital content for output by determining an output layout of the digital contents for arrangement selected by the content selection device, the content production device produces the digital content for output, including one or a plurality of layout areas per page-by-page basis, by arranging information forming the digital contents for arrangement into a predetermined frame in a layout area,
when a blank region containing no information arranged therewithin is present in the layout area after the information forming the digital contents for arrangement is arranged in the layout area, one of a plurality of information arrangement processes for arranging information into the blank region through respective different methods is selected based on page information relating to the page of the layout area, and information is arranged into the blank region through the selected information arrangement process,
a first information arranging process, which selects and stores the digital content based on a priority of the digital content, is selected when a page number of the layout area including the blank region is in a first range of page numbers,
a second information arranging process, which selects and stores digital content based on a number of characters storable in the blank region, is selected when the page number of the layout area including the blank region is in a second range of page numbers that is less than the first range,
and a third information arranging process, which selects and stores the digital content including text information with a minimum number of characters, is selected when the page number of the layout area including the blank region is in a third range of page numbers that is less than the second range.

3. A digital content production system, comprising:
a content storage device that stores registered digital contents;
a content selection device that selects digital contents for arrangement in the content storage device, and
a content production device that produces the digital content for output by determining an output layout of the digital contents for arrangement selected by the content selection device, the content production device produces the digital content for output by arranging information forming the digital contents for arrangement into a predetermined frame in a layout area,
when a blank region containing no information arranged therewithin is present in the layout area after the information forming the digital contents for arrangement is arranged in the layout area, one of a plurality of information arrangement processes for arranging information into the blank region through respective different methods is selected based on the location of the blank region in the layout area, and information is arranged into the blank region through the selected information arrangement process,
a first information arranging process, which selects and stores the digital content based on a priority of the digital content, is selected when the blank region occurs in a top half portion of the layout area,
and a second information arranging process, which selects and stores digital content based on a number of characters storable in the blank region, is selected when the blank region occurs in a bottom half portion of the layout area.

4. A digital content production system, comprising:
a content storage device that stores registered digital contents;
a content selection device that selects digital contents for arrangement in the content storage device; and
a content production device that produces the digital content for output by determining an output layout of the digital contents for arrangement selected by the content selection device, the content production device producing the digital content for output by arranging information forming the digital contents for arrangement into a predetermined frame in a layout area, when a blank region containing no information arranged therewithin is present in the layout area after the information forming the digital contents for arrangement is arranged in the layout area, one of a plurality of information arrangement processes for arranging information into the blank region through respective different methods is selected based on the shape of the blank region, and information is arranged into the blank region through the selected information arrangement process, a first information arranging process, which selects and stores digital content based on a number of characters storable in the blank region, is selected when a vertical side of a shape of the blank region is longer than the horizontal side of the shape of the blank region, or the horizontal side of the shape of the blank region is longer than the vertical side of the shape of the blank region, by more than a predetermined value, and a second information arranging process, which selects and stores the digital content based on a priority of the digital content, is selected when the vertical side of a shape of the blank region is not longer than the horizontal side of the shape of the blank region, or the horizontal side of the shape of the blank region is not longer than the vertical side of the shape of the blank region, by more than the predetermined value.

5. A digital content production system, comprising;

a content storage device that stores registered digital contents;

a content selection device that selects digital contents for arrangement in the content storage device; and a content production device that produces the digital content for output by determining an output layout of the digital contents for arrangement selected by the content selection device, the content production device producing the digital content for output by arranging information forming the digital contents for arrangement into a predetermined frame in a layout area, when a blank region containing no information arranged therewithin is present in the layout area after the information forming the digital contents for arrangement is arranged in the layout area, one of a plurality of information arrangement processes for arranging information into the blank region through respective different methods is selected based on a designated upper limit of a number of pages, and information is arranged into the blank region through the selected information arrangement process, a first information arranging process, which selects and stores the digital content including text information with a minimum number of characters, is selected when an upper limit of a number of pages is less than a predetermined value, and a second information arranging process, which selects and stores the digital content based on a priority of the digital content, is selected when the upper limit of the number of pages is greater than or equal to the predetermined value.

6. A digital content production system, comprising:

a content storage device that stores registered digital contents;

a content selection device that selects digital contents for arrangement in the content storage device; and a content production device that produces the digital content for output by determining an output layout of the digital contents for arrangement selected by the content selection device, the content production device produces the digital content for output by arranging information forming the digital contents for arrangement into a predetermined frame in a layout area, when a blank region containing no information arranged therewithin is present in the layout area after the information forming the digital contents for arrangement is arranged in the layout area, one of a plurality of information arrangement processes for arranging information into the blank region through respective different methods is selected based on a number of digital contents for arrangement selected by the content selection device, and information is arranged into the blank region through the selected information arrangement process, a first information arranging process, which selects and stores the digital content based on a priority of the digital content, is selected when a number of the digital contents selected by the content selection device is greater than or equal to a predetermined value, and a second information arranging process, which selects and stores digital content based on a number of characters storable in the blank region, is selected when a number of the digital contents selected by the content selection device is less than the predetermined value.

7. A recording medium on which is recorded a digital content production program for operation with a digital content production system, the digital content production system having a content storage device that stores registered digital contents, a content selection device that selects digital contents for arrangement in the content storage device, and a content production device that produces the digital content for output by determining an output layout of the digital contents for arrangement selected by the content selection device, the content production device produces the digital content for output by arranging information forming the digital contents for arrangement into a predetermined frame in a layout area, the recording medium including instructions for causing the content selection device and the content production device to perform a process so that, when a blank region containing no information arranged therewithin is present in the layout area after the information forming the digital contents for arrangement is arranged in the layout area, one of a plurality of information arrangement processes for arranging information into the blank region through respective different methods is selected based on the size of the blank region, information is arranged into the blank region through the selected information arrangement process, a first information arranging process, which selects and stores the digital content based on a priority of the digital content, is selected when a number of characters storable in the blank region is in a first range of storable characters, a second information arranging process, which selects and stores digital content based on the number of characters storable in the blank region, is selected when the number of characters storable in the blank region is in a second range of storable characters that is less than the first range, and a third information arranging process, which selects and stores the digital content including text information with a minimum number of characters, is selected when the number of characters storable in the blank region is in a third range of storable characters that is less than the second range.

8. A recording medium on which is recorded a digital content production program for operation with a digital content production system, the digital content production system having a content storage device that stores registered digital contents, a content selection device that selects digital contents for arrangement in the content storage device, and a content production device that produces the digital content for output by determining an output layout of the digital contents for arrangement selected by the content selection device, the content production device produces the digital content for output, including one or a plurality of layout areas per page-by-page basis, by arranging information forming the digital contents for arrangement into a predetermined frame in a layout area, the recording medium including instructions for causing the content selection device and the content production device to perform a process so that, when a blank region containing no information arranged therewithin is present in the layout area after the information forming the digital contents for arrangement is arranged in the layout area, one of a plurality of information arrangement processes for arranging information into the blank region through respective different methods is selected based on page information relating to the page of the layout area, information is arranged into the blank region through the selected information arrangement process, a first information arranging process, which selects and stores the digital content based on a priority of the digital content, is selected when a page number of the layout area including the blank region is in a first range of page numbers, a second information arranging process, which selects and stores digital content based on a number of characters storable in the blank region, is selected when the page number of the layout area including the blank region is in a second range of page numbers that is less than the first range, and a third information arranging process, which selects and stores the digital content including text information with a minimum number of characters, is selected when the page number of the layout area including the blank region is in a third range of page numbers that is less than the second range.

9. A recording medium on which is recorded a digital content production program for operation with a digital content production system, the digital content production system having a content storage device that stores registered digital contents, a content selection device that selects digital contents for arrangement in the content storage device, and a content production device that produces the digital content for output by determining an output layout of the digital contents for arrangement selected by the content selection device, the content production device produces the digital content for output by arranging information forming the digital contents for arrangement into a predetermined frame in a layout area, the recording medium including instructions for causing the content selection device and the content production device to perform a process so that, when a blank region containing no information arranged therewithin is present in the layout area after the information forming the digital contents for arrangement is arranged in the layout area, one of a plurality of information arrangement processes for arranging information into the blank region through respective different methods is selected based on the location of the blank region in the layout area, information is arranged into the blank region through the selected information arrangement process, a first information arranging process, which selects and stores the digital content based on a priority of the digital content, is selected when the blank region occurs in a top half portion of the layout area, and a second information arranging process, which selects and stores digital content based on a number of characters storable in the blank region, is selected when the blank region occurs in a bottom half portion of the layout area.

10. A recording medium on which is recorded a digital content production program for operation with a digital content production system, the digital content production system having a content storage device that stores registered digital contents, a content selection device that selects digital contents for arrangement in the content storage device, and a content production device that produces the digital content for output by determining an output layout of the digital contents for arrangement selected by the content selection device, the content production device producing the digital content for output by arranging information forming the digital contents for arrangement into a predetermined frame in a layout area, the recording medium including instructions for causing the content selection device and the content production device to perform a process so that, when a blank region containing no information arranged therewithin is present in the layout area after the information forming the digital contents for arrangement is arranged in the layout area, one of a plurality of information arrangement processes for arranging information into the blank region through respective different methods is selected based on the shape of the blank region, information is arranged into the blank region through the selected information arrangement process, a first information arranging process, which selects and stores digital content based on a number of characters storable in the blank region, is selected when a vertical side of a shape of the blank region is longer than the horizontal side of the shape of the blank region, or the horizontal side of the shape of the blank region is longer than the vertical side of the shape of the blank region, by more than a predetermined value, and a second information arranging process, which selects and stores the digital content based on a priority of the digital content, is selected when the vertical side of a shape of the blank region is not longer than the horizontal side of the shape of the blank region, or the horizontal side of the shape of the blank region is not longer than the vertical side of the shape of the blank region, by more than the predetermined value.

11. A recording medium on which is recorded a digital content production program for operation with a digital content production system, the digital content production system having a content storage device that stores registered digital contents, a content selection device that selects digital contents for arrangement in the content storage device, and a content production device that produces the digital content for output by determining an output layout of the digital contents for arrangement selected by the content selection device, the content production device producing the digital content for output by arranging information forming the digital contents for arrangement into a predetermined frame in a layout area, the recording medium including instructions for causing the content selection device and the content production device to perform a process so that, > when a blank region containing no information arranged therewithin is present in the layout area after the information forming the digital contents for arrangement is arranged in the layout area, one of a plurality of information arrangement processes for arranging information into the blank region through respective different methods is selected based on a designated upper limit of the number of pages, information is arranged into the blank region through the selected information arrangement process,
>
> a first information arranging process, which selects and stores the digital content including text information with a minimum number of characters, is selected when an upper limit of a number of pages is less than a predetermined value,
>
> and a second information arranging process, which selects and stores the digital content based on a priority of the digital content, is selected when the upper limit of the number of pages is greater than or equal to the predetermined value.

12. A recording medium on which is recorded a digital content production program for operation with a digital content production system, the digital content production system having a content storage device that stores registered digital contents, a content selection device that selects digital contents for arrangement in the content storage device, and a content production device that produces the digital content for output by determining an output layout of the digital contents for arrangement selected by the content selection device, the content production device produces the digital content for output by arranging information forming the digital contents for arrangement into a predetermined frame in a layout area, the recording medium including instructions for causing the content selection device and the content production device to perform a process so that, > when a blank region containing no information arranged therewithin is present in the layout area after the information forming the digital contents for arrangement is arranged in the layout area, one of a plurality of information arrangement processes for arranging information into the blank region through respective different methods is selected based on the number of digital contents for arrangement selected by the content selection device, information is arranged into the blank region through the selected information arrangement process,
>
> a first information arranging process, which selects and stores the digital content based on a priority of the digital content, is selected when a number of the digital contents selected by the content selection device is greater than or equal to a predetermined value,
>
> and a second information arranging process, which selects and stores digital content based on a number of characters storable in the blank region, is selected when a number of the digital contents selected by the content selection device is less than the predetermined value.

* * * * *